United States Patent
Oroz Mateo et al.

(10) Patent No.: US 12,036,534 B2
(45) Date of Patent: Jul. 16, 2024

(54) AMMONIA DEPOSITION PRECIPITATION PROCESS FOR PRODUCING A COPPER-NICKEL/GAMMA-ALUMINA CATALYST, SAID CATALYST AND ITS USE IN THE CONVERSION OF EXHAUST GASES

(71) Applicants: Universiteit Antwerpen, Antwerp (BE); Lurederra Centro Tecnológico, Los Arcos (ES); Universita' Degli Studi di Padova, Padua (IT)

(72) Inventors: Tamara Oroz Mateo, Fuenmayor (ES); Cristina Salazar Castro, Logroño (ES); Jessica Fabro, Plasencis (IT); Paolo Canu, Padua (IT); Qi Xin, Boechout (BE); Pegie Cool, Keerbergen (BE); Vera Meynen, Geel (BE); Claudio Fernández Acevedo, Viana (ES); Luis Martinez De Morentin Osaba, Viana (ES)

(73) Assignee: Universiteit Antwerpen, Antwerp (BE)

( * ) Notice: Subject to any disclaimer, the term of this patent is extended or adjusted under 35 U.S.C. 154(b) by 576 days.

(21) Appl. No.: 17/288,564

(22) PCT Filed: Oct. 21, 2019

(86) PCT No.: PCT/EP2019/078617
§ 371 (c)(1),
(2) Date: Apr. 25, 2021

(87) PCT Pub. No.: WO2020/083854
PCT Pub. Date: Apr. 30, 2020

(65) Prior Publication Data
US 2021/0394162 A1    Dec. 23, 2021
US 2022/0387975 A9    Dec. 8, 2022

(30) Foreign Application Priority Data
Oct. 26, 2018    (EP) ................................... 18202982

(51) Int. Cl.
*B01J 23/755*    (2006.01)
*B01J 6/00*    (2006.01)
(Continued)

(52) U.S. Cl.
CPC ............. *B01J 23/755* (2013.01); *B01J 6/001* (2013.01); *B01J 21/04* (2013.01); *B01J 23/72* (2013.01);
(Continued)

(58) Field of Classification Search
CPC . B01J 23/755; B01J 6/001; B01J 21/04; B01J 23/72; B01J 37/035; B01J 37/04; F01N 3/101
(Continued)

(56) References Cited

FOREIGN PATENT DOCUMENTS

| CN | 107866231 A | * | 4/2018 | ............. B01D 53/48 |
| GB | 912444 A | * | 12/1962 | ............. B01J 23/72 |
| JP | H08108071 A | * | 4/1996 | ............. B01D 53/94 |

OTHER PUBLICATIONS

Examination report from India Application No. 202117016585 (filed Apr. 8, 2021), dated Sep. 6, 2022.
(Continued)

*Primary Examiner* — Patricia L. Hailey

(57) ABSTRACT

A process for the production of a catalyst comprising the steps of: dissolving the requisite quantities of copper nitrate and nickel nitrate in de-ionised water to provide a sub-0.30 molar aqueous solution of copper nitrate and nickel nitrate together in the ratio required; providing an ammoniacal solution by adding concentrated aqueous solution of ammonia in a quantity equal to between six and ten times the quantity required to realise both a 1:6 molar ratio for $Cu^{2+}$ to ammonia and a 1:6 molar ratio for $Ni^{2+}$ to ammonia; loading gamma alumina with 1 to 30% w/w of copper and nickel in a weight ratio of nickel to copper of 1:5 to 2:1 by
(Continued)

suspending the requisite quantity of gamma alumina in said ammoniacal solution to achieve the required loading of copper and nickel; stirring the resulting gamma alumina suspension for at least 4 h at room temperature; then the volatile components evaporate under ambient conditions leaving dry loaded gamma alumina, which is calcined at a temperature of at least 260° C. for at least 30 min with a constant heating up rate; a catalyst or catalyst mixture, the catalyst or each catalyst in the catalyst mixture being obtainable by the above-mentioned process; and the use of the catalyst or catalyst mixture for the conversion of exhaust gases from an internal combustion engine into carbon dioxide, water and nitrogen.

20 Claims, 18 Drawing Sheets

(51) Int. Cl.
B01J 21/04 (2006.01)
B01J 23/72 (2006.01)
B01J 37/03 (2006.01)
B01J 37/04 (2006.01)
F01N 3/10 (2006.01)

(52) U.S. Cl.
CPC ............. *B01J 37/035* (2013.01); *B01J 37/04* (2013.01); *F01N 3/101* (2013.01)

(58) Field of Classification Search
USPC ........................................................ 502/337
See application file for complete search history.

(56) References Cited

OTHER PUBLICATIONS

China Patent Office, Notice on the Second Office Action in China Patent App. No. 201980070623.7, dated Aug. 26, 2023.
China Patent Office, "Notice on the First Office Action" in China Patent App. No. 201980070623.7, dated Feb. 8, 2023.
Extended European Search Report from EP Application No. 18202982.7 (filed Oct. 26, 2018), dated Apr. 26, 2019.
International Search Report and Written Opinion from PCT Application No. PCT/EP2019/078617 (filed Oct. 21, 2019), dated Mar. 5, 2020.
Next-Gen-Cat Consortium, "Final Report Summary—NEXT-GEN-CAT (Development of NEXT GENeration cost efficient automotiveCATalysts)," Sep. 15, 2016, pp. 1-32.
Perin, G., et al., "Cu@LaNiO3 based nanocomposites in TWC applications," Applied Catalysis B: Environmental, Elsevier, Amsterdam, NL, vol. 209, Feb. 22, 2017, pp. 214-222.
Wang, Xiaolei, et al., "Steam reforming of dimethyl ether over Cu-Ni/[gamma]-Al2O3 bi-functional catalyst prepared by deposition-precipitation method," Intl. J. of Hydrogen Energy, vol. 35, No. 9, Mar. 12, 2010, pp. 4060-4068.
Xin, Qi, et al., "Preparation of CuO/SBA-15 catalyst by the modified ammonia driven deposition precipitation method with a high thermal stability and an efficient automotive CO and hydrocarbons conversion," Applied Catalysis B: Environmental, Elsevier, Amsterdam, NL, vol. 223, Mar. 29, 2017, pp. 103-111.

* cited by examiner

AMMONIA DEPOSITION PRECIPITATION PROCESS FOR PRODUCING A COPPER-NICKEL/GAMMA-ALUMINA CATALYST, SAID CATALYST AND ITS USE IN THE CONVERSION OF EXHAUST GASES

TECHNICAL FIELD OF THE INVENTION

The present invention relates to a process for producing a catalyst, a catalyst or catalyst mixture, the catalyst or each catalyst in the catalyst mixture being obtainable by the process and the use of the catalyst or catalyst mixture for the conversion of exhaust gases.

BACKGROUND OF THE INVENTION

In three-way catalysts (TWCs) the simultaneous oxidation of CO and unburned hydrocarbons and reduction of NO has to be achieved. Moreover, NO should be selectively reduced to nitrogen.

G. Ertl et al. in 2008 in Handbook of Heterogeneous Catalysis, 2nd edition, Wiley-VCH, pages 2237-2331, identified copper-based heterogeneous catalysts as potential candidates for replacing Pd and Pt for vehicular oxidation of CO and hydrocarbons.

X. Guo et al. in 2009 in Catalysis Letters, volume 132(1-2), pages 22-27, disclose the successful synthesis of high copper contented mesoporous Cu/SBA-15 catalysts with high copper dispersion via the simple ammonia-driving deposition-precipitation method. The physicochemical properties of these Cu/SBA-15 catalysts were studied through various characterization methods such as BET, XRD, SEM, TEM and TPR. The catalytic activities of these catalysts were determined on the hydrogenation of dimethyl oxalate (DMO) to ethylene glycol (EG) under gas-phase fixed-bed conditions at high space-time yield. The results revealed that the high copper contented Cu/SBA-15 catalyst still has high specific area, proper pore volume and mesoporous structure, and the catalysts showed much higher activities compared to the one prepared by impregnation method.

Q. Xin et al. in 2016 in Catalysts, volume 6, pages 164 to 178, reported the preparation of CuO/SBA-15 catalyst with a loading of 10% by weight of copper prepared with the copper acetylacetonate (acac) complex, $Cu(acac)_2$, using molecular designed dispersion (MDD) methods and ammonia-driven deposition precipitation (ADP) methodology with a molar ratio $Cu^{2+}/NH_3$ of 1/6 and showed that with the catalyst prepared using ADP methodology exhibited a similar catalytic oxidation performance for CO and the hydrocarbons propene, propane and methane to that of a commercial precious metal-loaded three-way catalyst, whereas that prepared using MDD methods exhibited a significantly inferior catalytic oxidation performance for CO and the hydrocarbons propene, propane and methane, see Table 2 of this paper reproduced below:

TABLE 2

Light-off temperature ($T_{50}$) and maximum conversion ($C_{max}$) of each component for ADP, MDD and three-way catalyst (TWC) catalysts.

| | CO | | $C_3H_6$ | | $C_3H_8$ | | $CH_4$ | | NO | |
|---|---|---|---|---|---|---|---|---|---|---|
| Catalyst | $T_{50}$ (° C.) | $C_{Max}$ (%) | $T_{50}$ (° C.) | $C_{Max}$ (%) | $T_{50}$ (° C.) | $C_{Max}$ (%) | $T_{50}$ (° C.) | $C_{Max}$ (%) | $T_{50}$ (° C.) | $C_{Max}$ (%) |
| MDD | 410 | 80 | 325 | 100 | — | 25 | — | 0.6 | — | 8.0 |
| ADP | 202 | 100 | 260 | 100 | 430 | 85 | — | 10.7 | — | 4.0 |
| TWC | 222 | 100 | 225 | 100 | 370 | 89 | — | 9.7 | — | 40 |

The ADP methodology used, adapted and modified that disclosed by X. Guo et al. in 2009 in Catalysis Letters, volume 132(1-2), pages 22-27. X-ray photoelectron spectroscopy (XPS) spectra revealed the existence of $Cu^{2+}$ on ADP and MDD catalysts' surfaces, the $Cu2p_{3/2}$ signal, situated between 933.5 and 936.0 eV, can be deconvoluted into two peaks centred at 933.7 and 935.9 eV, respectively. The peak at a lower binding energy (BE) was attributed to the CuO species distributed on the surface, which dominates in the case of the MDD sample and is relatively weak in the case of the ADP sample, while the peak at a higher BE could be due to the formation of copper hydroxyl groups or to the interaction with the neighbouring Si—O bonds i.e. strong metal-support interaction.

| | | | | $Cu2p_{3/2}$ peak 1 | | $Cu2p_{3/2}$ peak 2 | |
|---|---|---|---|---|---|---|---|
| | Cu content [wt %] | | Preparation | Binding energy | Relative peak height | Binding energy | Relative peak height |
| Support | theoretical | measured | method | [eV] | [%] | [eV] | [%] |
| SBA-15 | 10 | 9.8 | ADP $Cu^{2+}$:$NH_3$ molar ratio of 1:6 | 933.7 | 31 | 935.9 | 69 |
| SBA-15 | 10 | | MDD | 933.7 | v. high | 935.9 | v. low |

$H_2$-TPR (Temperature programmed reduction) analysis showed that the main reduction of the ADP sample took place at 270° C. which is 55° C. higher than the reduction of the MDD sample, the higher reduction temperature indicating a higher energy requirement for the metal reduction which is caused by the strong metal-support interaction, as evidenced by the XPS result.

and that of a commercial precious metal-loaded three-way catalyst; and of the catalysts prepared using ADP methodology, that prepared with a molar ratio $Cu^{2+}/NH_3$ of ⅓ (CS-13) exhibited the most similar performance to that of a commercial precious metal-loaded three-way catalyst, see Table 5 of this paper reproduced below:

TABLE 5

Activity test: catalysts' light-off temperature ($T_{50}$) and maximum conversion of each component.

| | TWC | | CS-WI | | CS-13 | | CS-14 | | CS-16 | |
|---|---|---|---|---|---|---|---|---|---|---|
| Component | $T_{50}$ (° C.) | $C_{max}$ (%) | $T_{50}$ (° C.) | $C_{max}$ (%) | $T_{50}$ (° C.) | $C_{max}$ (%) | $T_{50}$ (° C.) | $C_{max}$ (%) | $T_{50}$ (° C.) | $C_{max}$ (%) |
| CO | 222 | 97 | 312 | 91 | 204 | 100 | 215 | 100 | 207 | 100 |
| $CH_4$ | — | 10 | — | 0 | — | 11 | — | 16 | — | 11 |
| $C_3H_6$ | 225 | 100 | 430 | 97 | 269 | 100 | 284 | 100 | 265 | 100 |
| $C_3H_8$ | 370 | 89 | — | 10 | 433 | 90 | 420 | 86 | 433 | 84 |
| NO | — | 40 | — | 7 | — | 8 | — | 4 | — | 6 |

Furthermore, G. Perin et al. in 2017 in Applied Catalysis B: Environmental, volume 209, pages 214-227, reported the development of several nanocomposites of the type $CuO/LaNiO_3$ for application as noble metal free catalysts in TWC, the nanocomposites being obtained by depositing copper oxide on lanthanum nickelate with the supporting perovskite being prepared by means of the citrate route; the copper, in contrast, being deposited by means of an innovative procedure: the ammonia driven deposition precipitation method (ADP) optimized for deposition on perovskites, the nanocomposites developed being based on the catalytic activity of $LaNiO_3$ in oxidation and reforming reactions and of copper in reduction reactions with the nanocomposition being thus used to deposit a highly dispersed active specie (CuO) on an active support ($LaNiO_3$) with the aim of building catalytic functionality. Complete NO reduction is achieved at rich conditions; also, hydrocarbons reforming reactions typically occurring at substoichiometric $O_2$, with CO and $H_2$ production, are less supported, preserving the activity in NO reduction.

Furthermore, Q. Xin et al. in 2018 in Applied Catalysis B: Environmental, volume 223, pages 103-115 (published online on Mar. 29, 2017) reported the catalytic oxidation performance with CO and the hydrocarbons propene, propane and methane for CuO/SBA-15 catalysts with a loading of 10% by weight of copper prepared using the wet-impregnation method (CS-WI) and with a modified ammonia-driven deposition precipitation (ADP) methodology with a molar ratio $Cu^{2+}/NH_3$ of ⅓ (CS-13), ¼ (CS-14) and ⅙ (CS-16) respectively. The catalyst prepared using the wet-impregnation method (CS-WI) exhibited a significantly inferior catalytic oxidation performance with a stoichiometric feed mixture to those prepared using ADP methodology The XPS spectra reported in this paper for the Cu $2p_{3/2}$ signal, which consisted mainly of two peaks located at 933.5-934.0 eV and 935.9-936.1 eV, summarised in the table below, were assigned to $Cu^{2+}$ species on the surface of the material in the form of CuO and to CuO species interacting with the support matrix respectively, the relative contribution of the CuO species interacting with the support matrix increasing with the increase in $Cu^{2+}$: $NH_3$ molar ratio.

| | | Cu content [wt %] | | | $Cu2p_{3/2}$ peak 1 | | $Cu2p_{3/2}$ peak 2 | |
|---|---|---|---|---|---|---|---|---|
| | Support | nominal | measured | $Cu^{2+}$:$NH_3$ molar ratio | Binding energy [eV] | Relative peak height [%] | Binding energy [eV] | Relative peak height [%] |
| CS-13 | SBA-15 | 10 | 9.1 | 1:3 | 933.7 | 47% | 935.9 | 53% |
| CS-14 | SBA-15 | 10 | 9.4 | 1:4 | 933.7 | 38% | 935.9 | 62% |
| CS-16 | SBA-15 | 10 | 10.1 | 1:6 | 933.7 | 31% | 935.9 | 69% |

A main finding of this work was the enhanced catalytic life-span brought by a higher $Cu^{2+}/NH_3$ molar ratio despite the comparable CuO dispersion. The dominant presence of the grafted CuO on the CS-16 yields a significant improvement on the material's thermal stability, as confirmed by its XRD, $H_2$-TPR and TEM; and in the catalytic durability test as a function of time-on-stream. CuO/SBA-15 prepared with a ⅙ $Cu^{2+}/NH_3$ ratio demonstrated maintenance of its excellent activity after a run time of 8 hours at 700° C., while a strong decline of the activity was observed for the WI (wet impregnation) sample.

NEXT-GEN-CAT Report Summary, Project ID:280890, Funded under: FP7-NMP available on http://cordis.europa.eu/result/rcn/189188_en.html dated 15 Sep. 2016 describes research into the development of next generation cost efficient automotive catalysts with as objective the preparation and optimisation of various types of supports, promoters ($CeO_2$, $CeO_2$—$ZrO_2$, $Al_2O_3$) and active phases (perovskites and metal nanoparticles) using transition metals towards the partial replacement of platinum group metals in catalysts used in the automotive field involving preparation of supports, preparation of active phases, preparation of efficient catalysts and assessment of the various transition metals. The successful transfer of ammonia driven deposition precipitation (ADP) methodology from SBA-15 to commercially available supports, such as γ-alumina, was reported and Cu/Ni-loaded γ-alumina prepared using ADP methodology was reported to exhibit excellent catalytic conversion (oxidation) of CO and the hydrocarbons propane and propene with an increase in methane and propane conversion at higher nickel content.

Although promising catalytic oxidation results have been realised with copper-doped SBA-15 catalysts, SBA-15 is not the most optimal candidate as a support due to its low hydrothermal stability. Hence, catalytic oxidation catalysts with alternative more stable supports are required. However, a change of support means a change in chemical environment, changes in pore size and pore characteristics and other features rendering uncertain extrapolation from the promising results realised by copper-doping of SBA-15.

The NEXT-GEN report summary reports the successful transfer of ammonia driven deposition precipitation (ADP) methodology from SBA-15 to commercially available supports, such as γ-alumina and that Cu/Ni-loaded γ-alumina prepared using ADP methodology exhibited excellent catalytic conversion (oxidation) of CO and the hydrocarbons propane and propene with an increase in methane and propane conversion at higher nickel content. However, this report is unspecific in respect of the precise conditions under which ADP-methodology was applied, the most recent SBA-15 literature indicating that catalysts produced with the sub-stoichiometric $Cu^{2+}$ to ammonia molar ratio of 1:3 exhibited a better catalytic oxidation performance than the stoichiometric $Cu^{2+}$ to ammonia molar ratio of 1:4 or the super-stoichiometric $Cu^{2+}$ to ammonia molar ratio of 1:6, and is also unspecific in respect of the amounts of copper and nickel loaded.

Moreover, the NEXT-GEN report is silent in respect of the thermal stability of the catalysts and their capacity for catalytic conversion via reduction, specifically in respect of the reduction of nitric oxide. Moreover, the capacity of a catalyst for catalytic conversion via oxidation provides no indication of its performance in respect of its capacity for catalytic reduction.

The performance of catalysts in three-way catalytic converters is assessed with particular feed mixtures of carbon monoxide, propene, propane, methane and nitric oxide regarded as simulating the exhaust gases of internal combustion engines under stoichiometric and rich conditions, but, whereas effective conversion of carbon monoxide and propene is relatively easy to achieve, the oxidation of propane and particularly methane and the reduction of nitric oxide are more difficult to achieve and hence are better indicators of a promising catalyst for such applications.

SUMMARY OF THE INVENTION

It is an object of the present invention to provide a copper and nickel-doped gamma alumina catalyst for use in three-way catalyst converters.

An advantage of the present invention is the realisation of catalysts for the catalytic oxidation of carbon monoxide and hydrocarbons, such as propane, propene and methane with at least 30% conversion of methane and at least 85% conversion of carbon monoxide, propane and propene with a stoichiometric feed mixture.

A further advantage of the present invention is the realisation of catalysts for the catalytic reduction of nitrogen oxides, particularly nitric oxide, NO with at least 15% conversion of nitric oxide with a stoichiometric feed mixture and at least 50% conversion of nitric oxide with a rich feed mixture.

A still further advantage of the present invention is the prevention of nickel(II) hydroxide during the production process.

A yet still further advantage of the present invention is the prevention of copper aluminate formation upon calcination.

The above objective is accomplished by the production process, catalysts, catalyst mixtures and use in catalytic converters according to the present invention. In particular catalysts in which gamma alumina is doped with 1 to 30% w/w of copper and nickel in a weight ratio of nickel to copper of 1:5 to 2:1, with a weight ratio of 1:4 to 1.5:1 being preferred, a weight ratio of 1:3 to 1.3:1 being particularly preferred and a weight ratio of 1:2 to 1:1 being especially particularly preferred with a stoichiometric feed mixture of carbon monoxide, propene, propane, methane and nitric oxide exhibit a maximum conversion of methane of at least 30% and a maximum conversion of nitric oxide of at least 15% and with a rich mixture carbon monoxide, propene, propane, methane and nitric oxide exhibit a maximum conversion of nitric oxide of at least 50%, its production being preferably exclusive of molecular designed dispersion (MDD)-methodology, wet impregnation methodology and the average particle size of the gamma alumina being preferably in the range 10-20 nm.

Q. Xin et al. in 2017 in Applied Catalysis B: Environmental, volume 223, pages 103-105, published online on Mar. 29, 2017 reported the catalytic oxidation performance with CO and the hydrocarbons propene, propane and methane for CuO/SBA-15 catalysts and reported that catalysts produced by wet impregnation exhibited a significantly inferior catalytic oxidation performance for CO and the hydrocarbons propene, propane and methane compared with those produced using the ADP method and that XPS spectra for catalysts produced using the ADP-method showed the relative contribution of the CuO species interacting with the support matrix increasing with the increase in $Cu^{2+}:NH_3$. On the other hand, the Cu $2p_{3/2}$ signal in the XPS spectra for a CuO/SBA-15 catalyst with a loading of 10% w/w of copper produced using MDD-methodology exhibited two peaks at 933.7 eV and 935.9 eV assigned to $Cu^{2+}$ species on the surface of the material in the form of CuO and to CuO species interacting with the surface of the material in the form of CuO and to CuO species interacting with the support matrix respectively, in which the non-interacting CuO species dominated as shown in FIG. 1. In the case of the gamma alumina doped with 10% w/w of copper and 3% w/w of nickel, according to the present invention using ADP-methodology, the Cu $2p_{3/2}$ signal in the XPS spectra also consisted mainly of two peaks located at 932.7-933.3 eV and 934.4-935.3 eV, which were assigned to $Cu^{2+}$ species on the surface of the material in the form of CuO and to CuO species interacting with the surface of the material in the form of CuO and to CuO species interacting with the support matrix respectively, which all exhibited a high contribution of the latter, thereby rendering MDD-methodology prohibitive for the production of CuO—NiO-doped gamma alumina catalysts for use in three-way catalytic converters. EXAMPLE 1 and 2 show that wet impregnation methodology even using TECNAN gamma alumina (produced on an industrial scale according to parameters developed by Lurederra Technology Centre) is irreproducible and EXAMPLES 15 and 16 show that gamma aluminas from different sources can be used, although the catalytic activity realised will vary according to the gamma alumina type used, with gamma alumina with an average particle size in the range 10-20 nm being preferred.

According to a first aspect of the present invention a process for the production of a catalyst is provided, the process comprising the steps of: dissolving the requisite quantities of copper nitrate and nickel nitrate in de-ionised water to provide a sub-0.30 molar aqueous solution, preferably a sub-0.2 molar and particularly preferably 0.15 molar, of the copper nitrate and nickel nitrate together in the ratio required; providing an ammoniacal solution by adding concentrated aqueous solution of ammonia in a quantity equal to between six and ten times the quantity required to realise both a 1:6 molar ratio for $Cu^{2+}$ to ammonia and a 1:6 molar ratio for $Ni^{2+}$ to ammonia (some of the ammonia complexing with the $Cu^{2+}$ and the rest complexing with the $Ni^{2+}$); loading gamma alumina with 1 to 30% w/w of copper and nickel in a weight ratio of nickel to copper of 1:5 to 2:1, with a weight ratio of 1:4 to 1.5:1 being preferred, a weight ratio of 1:3 to 1.3:1 being particularly preferred and a weight ratio of 1:2 to 1:1 being especially particularly preferred by suspending the requisite quantity of gamma alumina in said ammoniacal solution to achieve the required loading of copper and nickel; stiffing the resulting gamma alumina suspension for at least 4 h at room temperature; then the volatile components evaporate under ambient conditions leaving dry loaded gamma alumina, which is calcined at temperature of at least 260° C. for at least 30 minutes with a constant heating up rate.

According to a second aspect of the present invention a catalyst or catalyst mixture is provided, the catalyst or each catalyst in the catalyst mixture being obtainable by the process according to the first aspect of the present invention.

According to a third aspect of the present invention the use of the catalyst or catalyst mixture of the second aspect for the conversion of exhaust gases from an internal combustion engine into carbon dioxide, water and nitrogen.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DESCRIPTION OF ILLUSTRATIVE EMBODIMENTS

Figure 1:
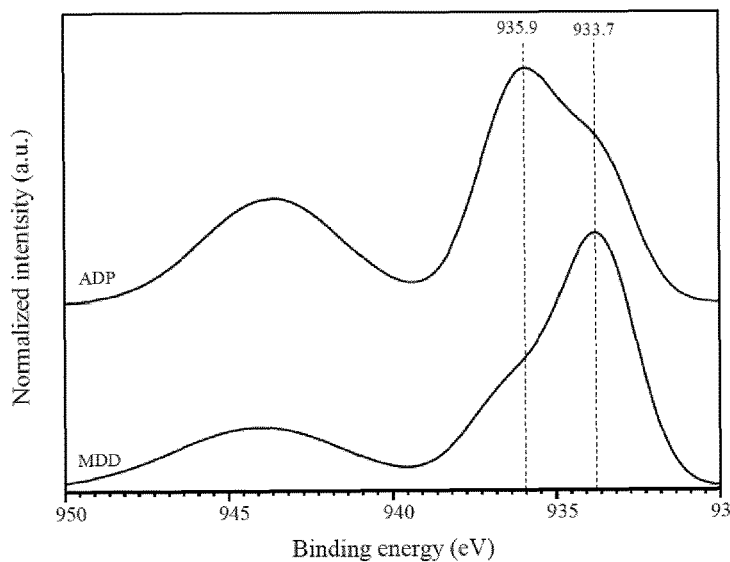
FIG. 1 shows the XPS spectra of the $Cu2p_{3/2}$ region for CuO/SBA-15 catalysts with 10% w/w of copper produced using ADP (top) and MDD (bottom) methodology.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The following terms are provided solely to aid in the understanding of the invention.

Definitions

The term "theoretical loading" applied to the loading of copper and nickel on gamma alumina, as used in disclosing the present invention, means the quantity of copper and nickel with respect to the quantity of gamma alumina suspended therein and hence the maximum loading i.e. if completely deposited thereon.

The term "point of zero charge", as used in disclosing the present invention, means that pH at which the surface has a net neutral charge.

The term "concentrated aqueous solution of ammonia", as used in disclosing the present invention, means an aqueous ammonium hydroxide solution with a density in the range 0.88 to 0.91 g/mL a density of 0.88 g/mL corresponding to 35% by weight of ammonia and 18.1 M ammonium hydroxide, a density of 0.90 g/mL corresponding to 28-30% by weight of ammonia and 14.5 M ammonium hydroxide, and a density of 0.91 g/mL 10 corresponding to 25% by weight of ammonia and 13.3 M ammonium hydroxide.

Detailed Description

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Process for the Production of a Catalyst

According to a first aspect of the present invention a process for the production of a catalyst is provided, the process comprising the steps of: dissolving the requisite quantities of copper nitrate and nickel nitrate in de-ionised water to provide a sub-0.30 molar aqueous solution of the copper nitrate and nickel nitrate together in the ratio required; providing an ammoniacal solution by adding concentrated aqueous solution of ammonia in a quantity equal to between four and ten times the quantity required to realise both a 1:6 molar ratio for $Cu^{2+}$ to ammonia and a 1:6 molar ratio for $Ni^{2+}$ to ammonia; loading gamma alumina with 1 to 30% w/w of copper and nickel in a weight ratio of nickel to copper of 1:5 to 2:1 by suspending the requisite quantity of gamma alumina in said ammoniacal solution to achieve the required loading of copper and nickel; stiffing the resulting gamma alumina suspension for at least 4 h at room temperature; then the volatile components evaporate under ambient conditions leaving dry loaded gamma alumina, which is calcined at a temperature of at least 260° C. for at least 30 minutes with a constant heating up rate.

According to a preferred embodiment of the first aspect of the present invention, the heating up rate is 1° C./min.

According to another preferred embodiment of the first aspect of the present invention, calcination is performed at a temperature of at least 550° C.

According to another preferred embodiment of the first aspect of the present invention, the concentration of copper and nickel nitrate in the aqueous solution are together greater than 0.005 molar, preferably greater than 0.01 molar and particularly preferably greater than 0.02 molar.

The concentrations of copper(II) nitrate used in the EXAMPLES were in the range of 0.009 to 0.062M. It was found that higher concentrations than 0.065M had an adverse effect on copper dispersion due to less gentle diffusion with possible copper cumulation (saturation). The concentrations of nickel(II) nitrate used in the EXAMPLES were in the range of 0.0034 to 0.066M.

According to a preferred embodiment of the first aspect of the present invention, the copper available for loading is 2 to 25% w/w with respect to gamma alumina. The contribution of weak-supporting copper oxide in $H_2$-TPR measurements increased upon increasing the loading of copper to 20 or 30% w/w with respect to the support, while the contribution due to bulk copper oxide remained low.

According to a preferred embodiment of the first aspect of the present invention, the weight ratio of nickel to copper is 1:4 to 1.5:1, with a weight ratio of nickel to copper of 1:3 to 1.3:1 being preferred.

According to a preferred embodiment of the first aspect of the present invention, and the average particle size of the gamma alumina is in the range 10-20 nm.

According to a preferred embodiment of the first aspect of the present invention, the quantity of concentrated aqueous solution of ammonia added is in a quantity of six to eight the quantity required to realise both a 1:6 molar ratio for $Cu^{2+}$ to ammonia and a 1:6 molar ratio for $Ni^{2+}$ to ammonia, with a quantity of concentrated aqueous solution of ammonia added being preferably in a quantity of six times the quantity required to realise both a 1:6 molar ratio for $Cu^{2+}$ to ammonia and a 1:6 molar ratio for $Ni^{2+}$ to ammonia.

According to another preferred embodiment of the first aspect of the present invention 0.57 g ($2.358 \times 10^{-3}$ moles) of copper nitrate ($Cu(NO_3)_2 \cdot 3H_2O$, >99%) and 0.22 g ($7.55 \times 10^{-4}$ moles) of nickel nitrate ($Ni(NO_3)_2 \cdot 6H_2O$, >99%) are added to a vial containing 75 mL de-ionized water; then concentrated aqueous solution of ammonia is added to the solution with a volume equal to six times that volume of ammonia required to obtain both a molar ratio of 1/6 for $Cu^{2+}/NH_3$ and a molar ratio of 1/6 for $Ni^{2+}/NH_3$; then 1.5 g of gamma alumina is suspended into the solution to achieve a Cu/Ni loading on gamma alumina of 10% w/w of Cu and 3% w/w of Ni if completely deposited thereon and the suspension stirred for 48 hours at room temperature; then the volatile components thereof evaporate under ambient conditions leaving dry loaded gamma alumina, which is finally calcined at 550° C. for 6 hours.

According to another preferred embodiment of the present invention 0.57 g ($2.358 \times 10^{-3}$ moles) of copper nitrate ($Cu(NO_3)_2 \cdot 3H_2O$, >99%) and 0.36 g ($1.23 \times 10^{-3}$ moles) of nickel nitrate ($Ni(NO_3)_2 \cdot 6H_2O$, >99%) are added to a vial containing 75 mL de-ionized water; then concentrated aqueous solution of ammonia is added to the solution with a volume equal to six times that volume of ammonia required to obtain both a molar ratio of 1/6 for $Cu^{2+}/NH_3$ and a molar ratio of 1/6 for $Ni^{2+}/NH_3$; then 1.5 g of gamma alumina is suspended into the solution to achieve a Cu/Ni loading on said gamma alumina of 10% w/w of Cu and 5% w/w of Ni if completely deposited thereon and the suspension stirred for 48 hours at room temperature; then the volatile components thereof evaporate under ambient conditions leaving dry loaded gamma alumina, which is finally calcined at 550° C. for 6 hours.

According to another preferred embodiment of the first aspect of the present invention 0.57 g ($2.358 \times 10^{-3}$ moles) of copper nitrate ($Cu(NO_3)_2 \cdot 3H_2O$, >99%) and 0.72 g ($2.475 \times 10^{-3}$) of nickel nitrate ($Ni(NO_3)_2 \cdot 6H_2O$, >99%) are added to a vial containing 75 mL de-ionized water; then concentrated aqueous solution of ammonia is added to the solution with a volume equal to six times that volume of ammonia required to obtain both a molar ratio of 1/6 for $Cu^{2+}/NH_3$ and a molar ratio of 1/6 $Ni^{2+}/NH_3$; then 1.5 g of gamma alumina is suspended into the solution to achieve a Cu/Ni loading on gamma alumina of 10% w/w of Cu and 10% w/w of Ni if completely deposited thereon and the suspension stirred for 48 hours at room temperature; then the volatile components thereof evaporate under ambient conditions leaving dry loaded gamma alumina, which is finally calcined at 550° C. for 6 hours.

According to another preferred embodiment of the fist aspect of the present invention 0.17 g ($7.03 \times 10^{-4}$ moles) of copper nitrate ($Cu(NO_3)_2 \cdot 3H_2O$, >99%) and 0.22 g ($7.55 \times 10^{-4}$ moles) of nickel nitrate ($Ni(NO_3)_2 \cdot 6H_2O$, >99%) are added to a vial containing 75 mL de-ionized water; then concentrated aqueous solution of ammonia is added to the solution with a volume equal to six times that volume of ammonia required to obtain both a molar ratio of 1/6 for $Cu^{2+}/NH_3$ and a molar ratio of 1/6 for $Ni^{2+}/NH_3$; then 1.5 g of gamma alumina is suspended into the solution to achieve a Cu/Ni loading on said gamma alumina of 3% w/w of Cu and 3% w/w of Ni if completely deposited thereon and the suspension stirred for 48 hours at room temperature; then the volatile components thereof evaporate under ambient conditions leaving dry loaded gamma alumina, which is finally calcined at 550° C. for 6 hours.

According to another preferred embodiment of the present invention 0.17 g ($7.03 \times 10^{-4}$ moles) of copper nitrate ($Cu(NO_3)_2 \cdot 3H_2O$, >99%) and 0.074 g ($2.54 \times 10^{-4}$ moles) of nickel nitrate ($Ni(NO_3)_2 \cdot 6H_2O$, >99%) are added to a vial containing 75 mL de-ionized water; then concentrated aqueous solution of ammonia is added to the solution with a volume equal to six times that volume of ammonia required to obtain both a molar ratio of 1/6 for $Cu^{2+}/NH_3$ and a molar ratio of 1/6 for $Ni^{2+}/NH_3$; then 1.5 g of gamma alumina is suspended into the solution to achieve a Cu/Ni loading on said gamma alumina of 3% w/w of Cu and 1% w/w of Ni if completely deposited thereon and the suspension stirred for 48 hours at room temperature; then the volatile components thereof evaporate under ambient conditions leaving dry loaded gamma alumina, which is finally calcined at 550° C. for 6 hours.

According to another preferred embodiment of the present invention 1.14 g ($4.716 \times 10^{-3}$ moles) of copper nitrate ($Cu(NO_3)_2 \cdot 3H_2O$, >99%) and 0.48 g ($1.646 \times 10^{-3}$ moles) of nickel nitrate ($Ni(NO_3)_2 \cdot 6H_2O$, >99%) are added to a vial containing 75 mL de-ionized water; then concentrated aqueous solution of ammonia is added to the solution with a volume equal to six times that volume of ammonia required to obtain both a molar ratio of 1/6 for $Cu^{2+}/NH_3$ and a molar ratio of 1/6 for $Ni^{2+}/NH_3$; then 1.5 g of gamma alumina is suspended into the solution to achieve a Cu/Ni loading on said gamma alumina of 20% w/w of Cu and 6.6% w/w of Ni if completely deposited thereon and the suspension stirred for 48 hours at room temperature; then the volatile components thereof evaporate under ambient conditions leaving dry loaded gamma alumina, which is finally calcined at 550° C. for 6 hours.

According to another preferred embodiment of the present invention 1.14 g ($4.716 \times 10^{-3}$ moles) of copper nitrate ($Cu(NO_3)_2 \cdot 3H_2O$, >99%) and 1.44 g ($4.94 \times 10^{-3}$ moles) of nickel nitrate ($Ni(NO_3)_2 \cdot 6H_2O$, >99%) are added to a vial containing 75 mL de-ionized water; then concentrated aqueous solution of ammonia is added to the solution with a volume equal to six times that volume of ammonia required to obtain both a molar ratio of 1/6 for $Cu^{2+}/NH_3$ and a molar ratio of 1/6 for $Ni^{2+}/NH_3$; then 1.5 g of gamma alumina is suspended into the solution to achieve a Cu/Ni loading on said gamma alumina of 20% w/w of Cu and 20% w/w of Ni if completely deposited thereon and the suspension stirred for 48 hours at room temperature; then the volatile components thereof evaporate under ambient conditions leaving dry loaded gamma alumina, which is finally calcined at 550° C. for 6 hours.

According to a preferred embodiment of the first aspect of the present invention the concentration of copper is in the range of 1 to 30% by weight with respect to the weight of gamma alumina (% w/w), with 3 to 20% by weight with respect to the weight of gamma alumina (% w/w) being preferred and 5 to 10% by weight with respect to the weight of gamma alumina (% w/w) being particularly preferred.

According to another preferred embodiment of the first aspect of the present invention the concentration of nickel is in the range of 1 to 10% by weight with respect to the weight of gamma alumina (% w/w), with 3 to 7% by weight with respect to the weight of gamma alumina (% w/w) being preferred.

Ammonia Driven Deposition Precipitation Method

In the case of applying the ammonia-driven deposition precipitation method to copper-doping of gamma alumina, the method disclosed by X. Guo et al. in 2009 in Catalysis Letters, volume 132(1-2), pages 22-27, was modified by changing the $Cu^{2+}/NH_3$ ratio at constant pH. In addition to a different amount of $NH_3$ during the synthesis, a longer stirring time was used (48 h instead of 4 h) and a lower stirring temperature (room temperature instead of 80° C.) and differed slightly from that disclosed by Q. Xin et al. in 2016 in Catalysts, volume 6, pages 164 to 178, in that it was dried overnight at room temperature rather than 60° C. The drying temperature is critical with gamma alumina supports, since a higher temperature (e.g. 60° C.) will result in faster/high amount of ammonia evaporation leading to copper oxide precipitation. A higher volume of solution would necessitate much longer drying times at room temperature, which is also the case in the preparation of larger quantities of catalyst. For 1.00 g of catalyst, at least 16 hours drying at room temperature is preferred. The aim of these modifications was to maximize the copper dispersion upon the catalyst and its uniformity.

A stiffing time of 48 hours was used to maximise the metal dispersion, but a shorter stiffing time (e.g. the 4 h used by Guo et al.) could be used, although 48 hours stirring results in a higher monomeric content according to UV-DR measurements.

According to a preferred embodiment of the first aspect of the present invention, the stiffing time is at least 24 hours, with at least 48 hours being particularly preferred.

Regarding the calcination temperature, it should be at least 260° C., because the differential thermogravimetric (DTG) analysis shows a two-step decomposition at 240° C. and 260° C., which respectively corresponds to the decomposition of nitrate originating from the copper precursor and $NH_3$ ligands complexed with $Cu^{2+}$. The calcination temperature is expected to change the copper oxide dispersion and/or the metal-support interaction. A calcination temperature of 550° C. was used in the examples.

The heating up rate should be slow enough to enable the release of vapours and the anchoring of the metals to the surface. A heating up rate of 1° C./min was used in the examples, but faster heating ramps are possible.

Regarding the calcination time, since the heating rate is slow, a shorter time, for example 30 minutes, would be expected to result in catalysts with similar properties.

According to a preferred embodiment of the first aspect of the present invention, the period of calcination is at least 6 hours.

In the case of applying the ammonia-driven deposition precipitation method to copper/nickel-doping of gamma alumina, the method used for copper-doping was further modified to prevent the precipitation of nickel(II) hydroxide by adding the concentrated aqueous solution of ammonia in a quantity of six times to ten times the quantity required to realise both a 1:6 molar ratio for $Cu^{2+}$ to ammonia and a 1:6 molar ratio for $Ni^{2+}$ to ammonia, six times the quantity being just sufficient to prevent the precipitation of nickel(II) hydroxide.

An important aspect of the ammonia-driven deposition method induced by the addition of ammonia is the electrostatic adsorption of the copper tetra-ammonia complex on the support. The surface of oxide supports contain a certain electric charge, determined by the surface hydroxyl groups (—OH). When these groups are present in deprotonated —O$^-$ form, the surface will be in a net negative charge. Vice versa, when the hydroxyl groups are protonated (—OH$^{2+}$), the net charge of the surface will be positive. Each support has a so-called point of zero charge (PZC). This is the pH value for which the net charge of the support surface is zero when in an aqueous solution. A pH value which is above the PZC of the support will result in a negatively charged surface while a lower pH in a positively charged one. In our case, the ammonia addition will increase the pH of the solution from 7 to about 11. This exceeds the PZC for gamma alumina, which is 8-9.

According to another preferred embodiment of the first aspect of the present invention, the pH of the gamma alumina suspension is at least that corresponding to the point of zero charge (PZC) i.e. a pH of at least 8.

According to another preferred embodiment of the first aspect of the present invention, the pH of the gamma alumina suspension is at least 10.

Water and ammonia evaporate during the evaporation process leaving dry loaded gamma alumina. This avoids the losses resulting from filtration and washing steps and does not result in large copper oxide crystals because of the non-planar shape of the copper tetra-ammonia complex, unlike the situation with the copper-acetylacetonate complexes used in the MDD method.

Catalyst or Catalyst Mixture

According to a second aspect of the present invention a catalyst or catalyst mixture is provided, the catalyst or each catalyst in the catalyst mixture being obtainable by the process according to the first aspect of the present invention.

Use of the Catalyst or Catalyst Mixture

According to a third aspect of the present invention the use of the catalyst or catalyst mixture of the second aspect for the conversion of exhaust gases from an internal combustion engine into carbon dioxide, water and nitrogen.

Ingredients 28-30% aqueous solution of ammonia, from Sigma-Aldrich with a density of 0.90 g/mL $Cu(NO_3)_2.3H_2O$, >99%, from Merck $Ni(NO_3)_2.6H_2O$>99%, from Janssens Chemical Chloroform, $CHCl_3$≥99% from Sigma-Aldrich γ-alumina from the industrial nanoproduct supplier TECNAN (produced by exclusive Flame Spray Pyrolysis technology—FSP, according to the operation parameters developed by Lurederra Technology Centre), with, according to the leaflet of TECNAN entitled "Powder Nanoparticles", an average particle size in the range of 10-20 nm and a specific surface area in the range of 76-152 m$^2$/g, the measured characteristics being given in Table 1 below:

γ-alumina from Merck KGaA, see characteristics in Table 1 below:

TABLE 1

| | Supplier | $S_{BET}$ [m²/g] | $V_{meso}$ [cm³/g] | $d_p$ [nm] | Particle size >0.2 mm [%] | Particle size <0.063 mm [%] | Particle size >0.063 mm [%] |
|---|---|---|---|---|---|---|---|
| γ-alumina | TECNAN | 82.8 | 0.3 | 12.6 | | | |
| γ-alumina | MERCK | 141 | | | ≤2 | ≤28 | ≥72 |

EXAMPLES

Catalyst Preparation

Example 1 and 2

The CuO—NiO/γ-Al₂O₃ catalysts of EXAMPLE 1 and 2 were prepared using the wet impregnation method without ammonia using gamma alumina from TECNAN (based on the research and development carried out by Lurederra Technology Centre). 1.5 g of the particular γ-alumina was suspended in a 75 mL solution containing 0.57 g copper nitrate (Cu(NO₃)₂.3H₂O) (2.358×10⁻³ moles) and 0.22 g (7.55×10⁻⁴ moles) of nickel nitrate (Ni(NO₃)₂.6H₂O) to achieve a final Cu loading on the gamma alumina of 10% w/w and a final nickel loading of 3% w/w if completely deposited thereon. After 48 h stirring at room temperature, the suspension was dried at 60° C. overnight without the filtration step, followed by a calcination step at 550° C. for 6 h with a heating up rate of 1° C. min⁻¹.

Example 3

The CuO/γ-Al₂O₃ catalyst of EXAMPLE 3 was prepared by a modified ammonia driven deposition precipitation method (ADP) using gamma alumina from TECNAN (based on the research and development carried out by Lurederra Technology Centre). First, 75 mL de-ionized water was added to a vial containing 0.57 g (2.358×10⁻³ moles) of copper nitrate (Cu(NO₃)₂.3H₂O). After that concentrated aqueous solution of ammonia (28-30%) was added to a vial in order to obtain six-fold the quantity required to realise a molar Cu²⁺/NH₃ ratio of ⅙ i.e. 5.84 mL. Subsequently, 1.5 g of γ-alumina was suspended in the solution to achieve a 10% w/w final Cu loading on the gamma alumina if completely deposited thereon. The suspension was then stirred for 48 h at room temperature, followed by a drying step at room temperature in an open atmosphere overnight. Finally, the dried samples were calcined at 550° C. for 6 h with a heating rate of 1° C./min.

Examples 4 to 7

The CuO—NiO/γ-Al₂O₃ catalysts of EXAMPLES 4 to 7 were prepared by a modified ammonia driven deposition precipitation method (ADP): 0.57 g (2.358×10⁻³ moles) of copper nitrate (Cu(NO₃)₂.3H₂O) and 0.22 g (7.55×10⁻⁴ moles) of nickel nitrate (Ni(NO₃)₂.6H₂O) were added to a vial containing 75 mL de-ionized water. After that, different quantities of concentrated aqueous solution of ammonia (28-30%) was added to the solution with a volume equal to 4 (EXAMPLE 4), 6 (EXAMPLES 5 and 6) and 8 (EXAMPLE 7) times the quantity required to realise both a 1:6 molar ratio for Cu²⁺ to ammonia and a 1:6 molar ratio for Ni²⁺ to ammonia i.e. 4.8, 7.2 and 9.6 mL respectively. An excess of ammonia was necessary to avoid Ni(OH)₂ precipitation. 1.5 g of γ-alumina (TECNAN) was then suspended in the solution to achieve a final Cu/Ni loading on the gamma alumina of 10% w/w of Cu and 3% w/w of Ni if completely deposited thereon. Then, the suspensions were stirred for 48 h at room temperature, followed by drying step at room temperature in open atmosphere overnight during which the water and ammonia evaporated. Finally, the dried samples were calcined at 550° C. for 6 h with a heating up rate of 1° C./min.

Example 8

The CuO—NiO/γ-Al₂O₃ catalysts of EXAMPLES 8 was prepared by a modified ammonia driven deposition precipitation method (ADP): 0.57 g (2.358×10⁻³ moles) of copper nitrate (Cu(NO₃)₂.3H₂O) and 0.22 g (7.55×10⁻⁴ moles) of nickel nitrate (Ni(NO₃)₂.6H₂O) were added to a vial containing 150 mL de-ionized water giving a total solution concentration of 0.021M. After that concentrated aqueous solution of ammonia (28-30%) was added to the solution with a volume equal to 6 times the quantity required to realise both a 1:6 molar ratio for Cu²⁺ to ammonia and a 1:6 molar ratio for Ni²⁺ to ammonia i.e. 7.2 mL. 1.5 g of γ-alumina (TECNAN) was then suspended in the solution to achieve a final Cu loading of 10% w/w of Cu and a final Ni loading of 3% w/w if completely deposited thereon. Then, the suspensions were stirred for 48 h at room temperature, followed by drying step at room temperature in open atmosphere overnight during which the water and ammonia evaporated. Finally, the dried samples were calcined at 550° C. for 6 h with a heating up rate of 1° C./min.

Examples 9 to 14

The CuO—NiO/γ-Al₂O₃ catalysts of EXAMPLES 9 to 14 were prepared with different copper and nickel loadings by a modified ammonia driven deposition precipitation method (ADP) by adding the quantities of copper nitrate (Cu(NO₃)₂.3H₂O) and nickel nitrate (Ni(NO₃)₂.6H₂O) to a vial containing 75 mL de-ionized water. After that, concentrated aqueous solution of ammonia (28-30%) was added to the solution with a volume equal to 6 times the quantity required to realise both a 1:6 molar ratio for Cu²⁺ to ammonia and a 1:6 molar ratio for Ni²⁺ to ammonia. This excess of ammonia was necessary to avoid Ni(OH)₂ precipitation. 1.5 g of γ-alumina (TECNAN) was then suspended into the solution to achieve a final Cu/Ni loading on the gamma alumina of respectively 3/1 (EXAMPLE 9), 3/3 (EXAMPLE 10), 10/5 (EXAMPLE 11), 10/10 (EXAMPLE 12), 20/6.6 (EXAMPLE 13) and 20/20 (Example 14) in % (w/w) respectively if completely deposited thereon. Then, the suspensions were stirred for 48 h at room temperature, followed by a drying step at room temperature in open atmosphere overnight. Finally, the dried samples were calcined at 550° C. for 6 h with a heating rate of 1° C./min.

TABLE 2

| EXAMPLE | Total solution conc. | [Cu] maximum [wt %] | [Ni] maximum [wt %] | $Cu(NO_3)_2 \cdot 3H_2O$ [g] | $H_2O$ [mL] | $NH_4OH$ [mL] | $NH_3$ [mol] | $\gamma$-$Al_2O_3$ [g] | $Ni(NO_3)_2 \cdot 6H_2O$ [g] |
|---|---|---|---|---|---|---|---|---|---|
| 9  | 0.013M | 3  | 1    | 0.17 | 75 | 2.34  | 0.035 | 1.5 | 0.074 |
| 10 | 0.019M | 3  | 3    | 0.17 | 75 | 3.65  | 0.054 | 1.5 | 0.22  |
| 11 | 0.048M | 10 | 5    | 0.57 | 75 | 8.9   | 0.131 | 1.5 | 0.36  |
| 12 | 0.064M | 10 | 10   | 0.57 | 75 | 12.05 | 0.178 | 1.5 | 0.72  |
| 13 | 0.085M | 20 | 6.6  | 1.14 | 75 | 15.8  | 0.234 | 1.5 | 0.48  |
| 14 | 0.130M | 20 | 20   | 1.14 | 75 | 24.1  | 0.356 | 1.5 | 1.44  |

Examples 15 and 16

The CuO—NiO/$\gamma$-$Al_2O_3$ catalysts of EXAMPLES 15 and 16 were prepared with $\gamma$-alumina from Merck by a modified ammonia driven deposition precipitation method (ADP) by adding 0.57 g (2.358×10$^{-3}$ moles) of copper nitrate (Cu(NO$_3$)$_2$.3H$_2$O) and respectively 0.22 g (7.55×10$^{-4}$ moles) or 0.72 g (2.475×10$^{-3}$) of nickel nitrate (Ni(NO$_3$)$_2$.6H$_2$O) to a vial containing 75 mL de-ionized water. After that, concentrated aqueous solution of ammonia (28-30%) was added to the solution with a volume equal to 6 times the quantity required to realise both a 1:6 molar ratio for Cu$^{2+}$ to ammonia and a 1:6 molar ratio for Ni$^{2+}$ to ammonia. This excess of ammonia was necessary to avoid Ni(OH)$_2$ precipitation. 1.5 g of $\gamma$-alumina (Merck) was then suspended into the solution to achieve a Cu/Ni loading of respectively 10/3 and 10/10 in % (w/w) respectively. Then, the suspension was stirred for 48 h at room temperature, followed by a drying step at room temperature in open atmosphere overnight. Finally, the dried samples were calcined at 550° C. for 6 h with a heating rate of 1° C./min.

Physical Properties and Analysis

The porous properties of CuO and CuO/NiO-loaded $\gamma$-alumina catalysts together with the $\gamma$-alumina are summarised in Table 3 below:

TABLE 3

| Example | Sample | $\gamma$-$Al_2O_3$ | $S_{BET}$ [m$^2$/g] | $V_{meso}$ [cm$^3$/g] | $d_p$ [nm] | Cu content [wt %] | Ni content [wt %] | $d_{Cu}$ [nm] |
|---|---|---|---|---|---|---|---|---|
| 3 | 10CA   | TECNAN | 82.8 | 0.3 | 12.5 | 6.3 ± 2.2 (9.0) | —               | 20.7 |
| 5 | 10C3NA | TECNAN | 96.4 | 0.3 | 12.4 | 5.5 ± 1.2 (8.8) | 3.0 ± 1.1 (2.6) | 22.0 |

The discrepancy between the copper and nickel contents if completely deposited thereon given in Table 2 and the copper and nickel contents determined by SEM-EDX given in Table 3 (with the contents in wt % if completely deposited on the gamma alumina being given in brackets) could be due to a number of different factors. First it could be due to limitations in the SEM-EDX technique itself, since this it is only a surface detection method and determines the average concentration at ten different points with the standard deviation given in Table 3. Thus it could be due to competition between copper and nickel, the copper dispersion being more heterogeneous than that for nickel. Then random detection of several spots with low copper content would result in a lower average copper content than expected. A second possibility is that this is due to the much lower surface area of gamma alumina than the previously investigated SBA-15, for which a much better correlation was observed between copper content if completely deposited thereon and that determined by SEM-EDX, it being observed that a lower surface area resulted in a less uniform copper dispersion. Thirdly it appears that that a higher nickel concentration influences the surface composition of the material.

Figure 2A:
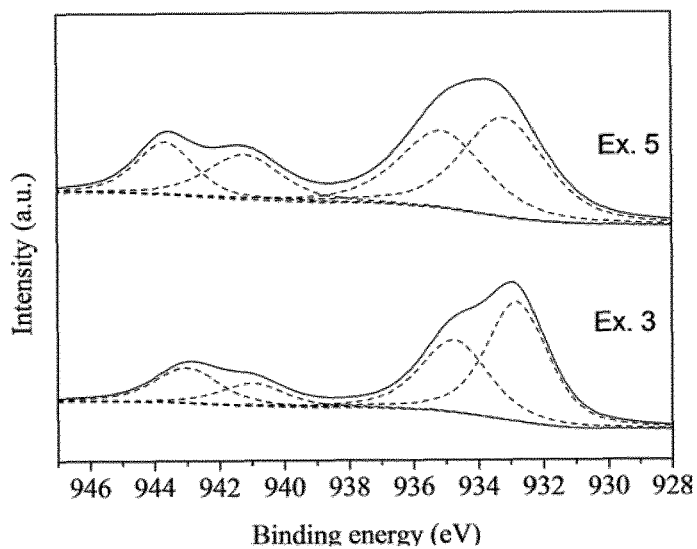
FIG. 2A shows the XPS spectra of the $Cu2p_{3/2}$ region for Examples 3 (10CA) and 5 (10C3NA).

FIG. 2A shows the XPS spectra of the Cu2p$_{3/2}$ region for Examples 3 (10CA) and 5 (10C3NA) with peaks at 932.7 eV-933.3 eV and 934.4 eV-935.3 eV, the relative peak heights of the two deconvoluted Cu2p$_{3/2}$ peaks being given in Table 4. These catalysts have a gamma alumina support. It is therefore surprisingly, that the XPS spectra of the Cu2p$_{3/2}$ region for Example 3 is similar to that observed for the silica substrate of SBA-15 supports doped with copper using ADP methodology, reported by Q. Xin et al. in 2016 in Catalysts, volume 6, pages 164 to 178, see the background of the invention section, although the peaks are observed at slightly lower energies, reflecting the change in support and the presence of nickel. The signal at a lower BE (binding energy) is attributed to CuO on the samples' surface while the peak at around 935 eV is related to CuO particles which have a strong interaction with the support. Unlike the CuO/SBA-15 by ADP, a relative lower intensity for the peak representative for grafted CuO is observed. The 10C3NA catalyst (EXAMPLE 5) seems to exhibit the highest amount of support interacting CuO (peak at around 935 eV). The presence of CuO is further evidenced by the characteristic shakeup satellite peaks between 940.0 eV-946.5 eV which show the existence of both well-dispersed CuO (943.0 eV) and bulk CuO (941.0 eV). The fact that the peak at higher binding energy is stronger than that at a lower binding energy indicates a dominance of copper oxide with strong metal-support interaction over CuO species distributed on the surface. It is also surprising that the addition of nickel in the case of Example 5, the XPS spectra of the Cu2p$_{3/2}$ region also exhibit a peak at higher binding energy that is much stronger than that at a lower binding energy, indicating that the presence of nickel does not change the dominance of copper oxide with strong metal-support interaction over CuO species distributed on the surface.

Figure 2B:
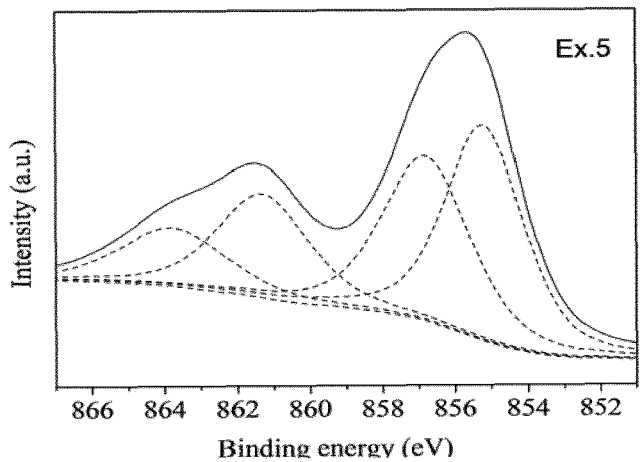
FIG. 2B shows the XPS spectra of the $Ni2p_{3/2}$ region for Example 5 (10C3NA).

FIG. 2B shows the XPS spectrum of the Ni2p$_{3/2}$ region for EXAMPLE 5, the Ni-loaded sample exhibited a main peak consisting of two overlapping signals at 855.0 eV and 856.8 eV, which correspond to the Ni$^{2+}$ species on the samples, as evidenced by the characteristic shake up from 860 eV to 864 eV. As with the Cu2p$_{3/2}$ spectra, these two signals can be attributed to bulk NiO (855.1 eV) and NiO (856.7 eV) with a strong support interaction respectively.

TABLE 4

| Example | | Cu2p$_{3/2}$ peak 1 | | Cu2p$_{3/2}$ peak 2 | |
|---|---|---|---|---|---|
| | | Binding energy [eV] | Relative peak height [%] | Binding energy [eV] | Relative peak height [%] |
| 3 | 10CA | 933.7 | 36 | 935.9 | 64 |
| 5 | 10C3NA | 933.7 | 39 | 935.9 | 61 |

H$_2$-TPR Measurements

Figure 3:
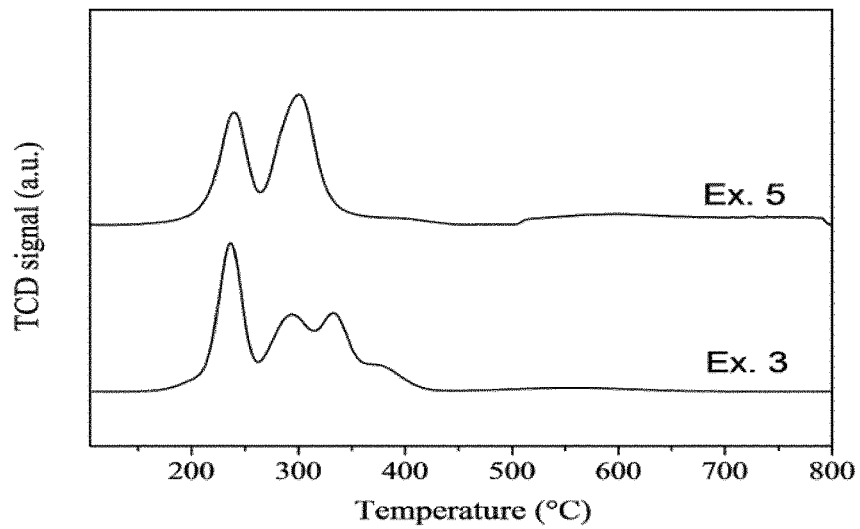
FIG. 3 shows the $H_2$-TPR profile of CuO and CuO/NiO-loaded catalysts for EXAMPLE 5 and EXAMPLE 3 from top to bottom.

H$_2$-TPR measurements were also performed to gain further insight in the metal dispersion and metal-support interactions. The result is shown in FIG. 3. It has been generally accepted that the reduction of CuO/Al$_2$O$_3$ material has mainly two stages, namely the reduction of well dispersed CuO at a lower temperature (typically around 200° C.) followed by the reduction of bulk CuO at a higher temperature. However, we have reported that a multiple reduction stage can exist on our samples depending on the copper species with various metal-support interaction. Therefore, the generally assumed reduction steps mentioned above may not be applicable in our case. Indeed, when the TPR profile of the 10CA catalyst (EXAMPLE 5), multiple reduction signals are observed at 236° C. (α1), 300° C. (α2), 333° C. (α3) and 380° C. (α4) respectively. The reduction of the α1 peak can be assigned to the reduction of well dispersed CuO with a weak metal-support interaction. Secondly, the α2 peak at 300° C. and the α3 peak at 333° C. are referred to the reduction of CuO with a strong metal support interaction and the reduction of amorphous bulk-like CuO, respectively. Finally, the signal at 380° C. (α4 peak) is related to the presence of crystalline bulk CuO.

The TPR profile of the 10CA sample (EXAMPLE 3) shows that the most of the copper species is present in the form of well-dispersed CuO with a weak metal-support interaction, although the other species are present as well. However, when NiO is introduced into the catalyst (EXAMPLE 5), a significant change in the CuO reduction behaviour is observed. First, a more intense CuO-support interacting signal (α3 and 4) can be observed when 3% w/w of Ni is additionally present. This result is in agreement with the XPS spectra of the samples, where the 10C3NA sample has the highest abundance of strong support-interacting CuO. Combining all of these observations, it can be adduced that there is an optimum Ni loading for a maximum amount of support interacting CuO and minimum amount of bulk CuO. On the other hand, the improvement of CuO dispersion by adding Ni into the catalyst is at the expense of its interaction with the support. Another fact that is worth mentioning is that the reduction signal related to the copper alumina alloy, copper aluminate, (around 450° C.) is not present. This observation is expected since the formation of copper aluminate only occurs at a temperature higher than 700° C. while our samples were calcined at 550° C. Apart from this, two new reduction signals showed up for the Ni loaded catalysts, located at 400° C. (β1) and at 600° C. (β2). These two signals are attributed to respectively the reduction of Cu—Ni alloy and NiO.

Catalytic Properties

Each catalyst was tested in stoichiometric and (fuel) rich conditions; the compositions of the feed mixtures used are given in Table 5 below.

TABLE 5

| | Stoichiometric | Rich |
|---|---|---|
| NO | 1000 ppm | 1000 ppm |
| CO | 0.7% | 0.9% |
| CH$_4$ | 225 ppm | 300 ppm |
| C$_3$H$_6$ | 450 ppm | 600 ppm |
| C$_3$H$_8$ | 225 ppm | 300 ppm |
| CO$_2$ | 15% | 15% |
| H$_2$O | 10% | 10% |
| H$_2$ | 0.233% | 0.3% |
| O$_2$ | 0.777% | 0.609% |
| Balance | He | He |
| λ | 1.0 | 0.6 |

Figure 4:
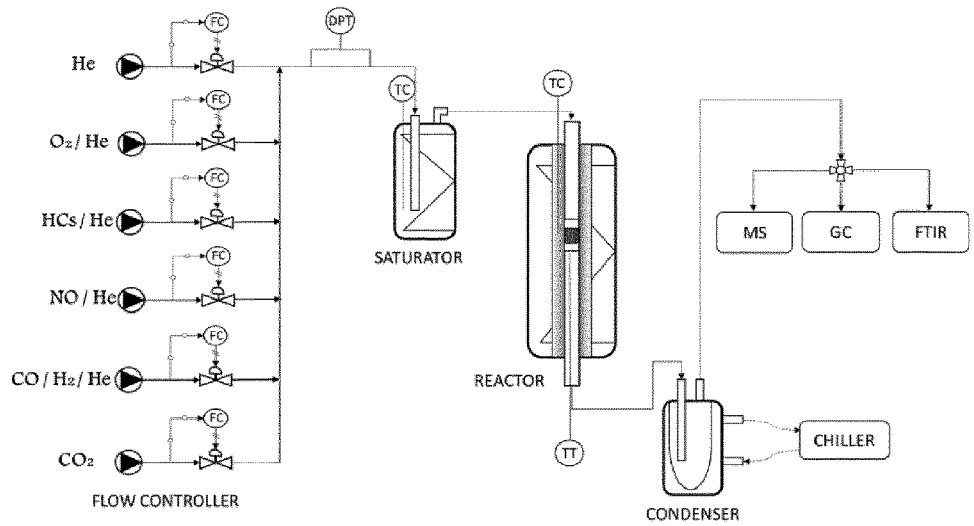
FIG. 4 is a schematic of the experimental set-up used for evaluating the catalytic performance of catalysts disclosed herein.

A schematic of the experimental set-up used for the evaluation of the catalytic performance of the above-mentioned catalysts is shown in FIG. 4. The reactor consisted of an electrically heated furnace with an internal quartz tube (inner diameter of 8 mm) in which the catalytic bed was placed. The contact time was specified as GHSV=60000 h$^{-1}$, calculated assuming that the density of the bed was 1 g/mL. The average quantity of catalyst loaded for each test was about 150 mg.

The procedure of the standard protocol followed comprised the following steps:
1. Pre-heating in air at 600° C. for 1 hour;
2. Switching to the reactant feed (stoichiometric or rich feed mixture);
3. Isothermal stage at 600° C. for 1 hour;
4. A stepwise cooling stage at −2° C./min;
5. Isothermal stage at 90° C. for one hour.

The vapour in the outlet gas was condensed and the mixture continuously analysed by gas chromatography (GC) and Fourier-transform infrared spectroscopy (FTIR). GC identifies and quantifies all the other species except NO, NO$_2$ and N$_2$O, which are measured by FTIR.

Catalytic Properties of the Catalysts of Examples 1 and 2

It proved impossible to evaluate the catalytic properties of EXAMPLE 1 because it had a very broad particle size distribution with a large fraction of fines, which result in poorly permeable packing, over-pressurising the rig at the flow rate required to achieve the same GHSV of the protocol. Above a threshold value, the experimental set-up could not operate in safe and regular conditions and the test interrupts, the bed being pushed down by the flow, thereby leaving the reactor. After sieving the sample to select a narrower size distribution, the quantity was below that necessary for the tests and granulation of the sample was unsuccessful as the particles stuck together.

Figure 5A:
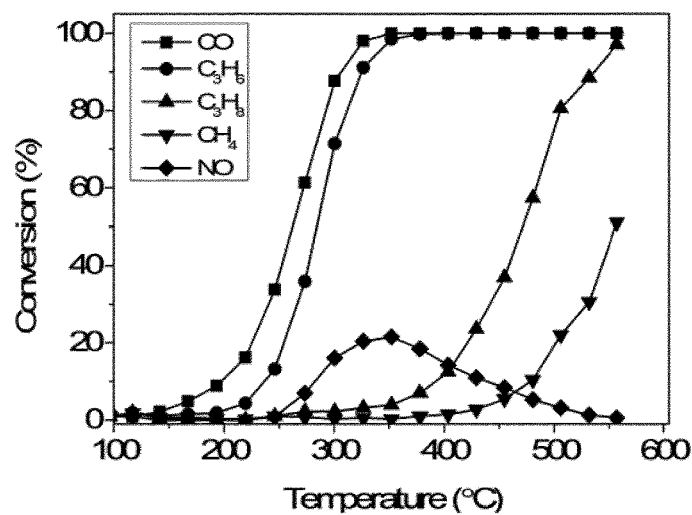
FIG. 5A is a graphical representation of the results for the catalytic conversion of CO, $C_3H_6$, $C_3H_8$, $CH_4$ and NO for the catalyst of Example 2: stoichiometric feed mixture.
Figure 5B:
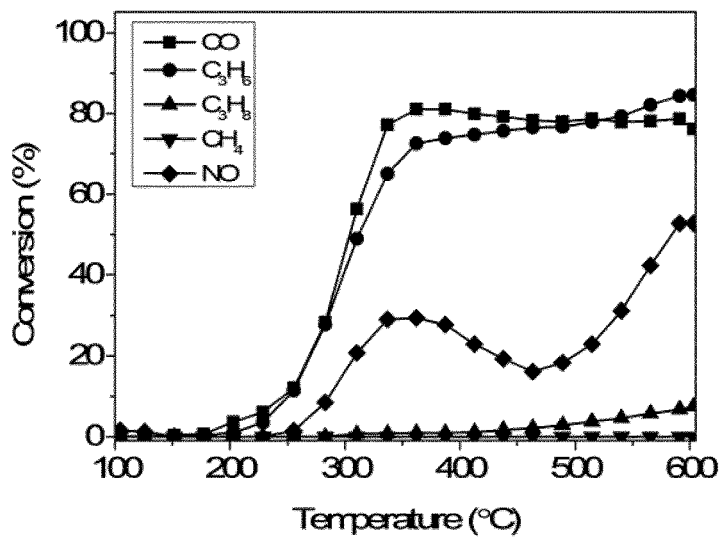
FIG. 5B is a graphical representation of the results for the catalytic conversion of CO, $C_3H_6$, $C_3H_8$, $CH_4$ and NO for the catalyst of Example 2: rich feed mixture.
Figure 6A:
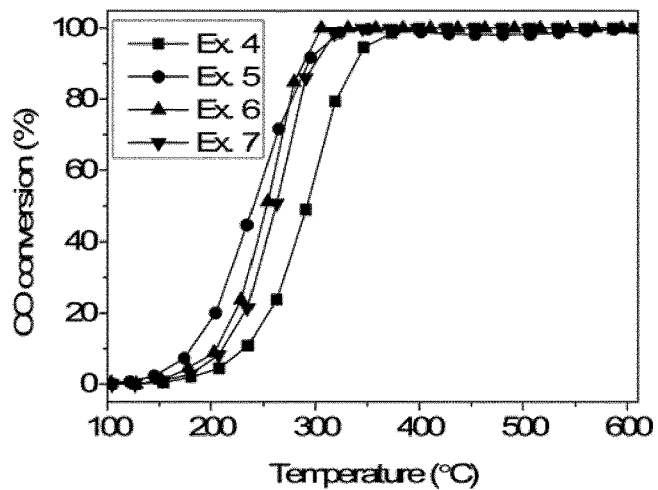
FIG. 6A is a graphical representation of the results for the catalytic CO conversion by CuO/NiO-loaded γ-alumina-support catalysts for Examples 4-7: stoichiometric feed mixture.
Figure 6B:
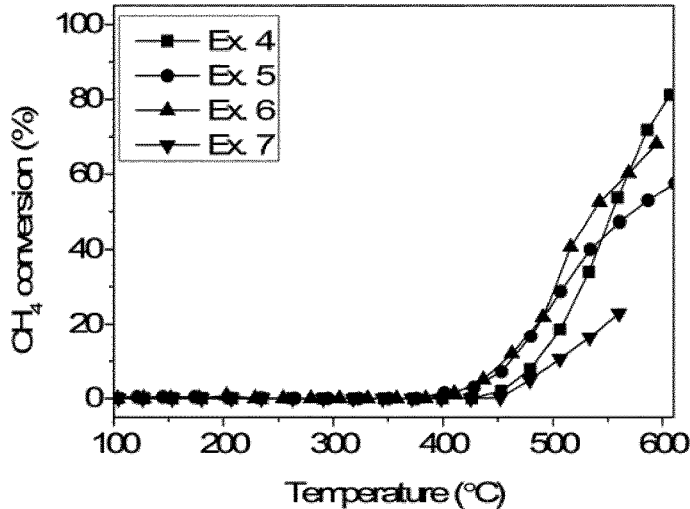
FIG. 6B is a graphical representation of the results for the catalytic methane conversion by CuO/NiO-loaded γ-alumina-support catalysts for Examples 4-7: stoichiometric feed mixture.
Figure 6C:
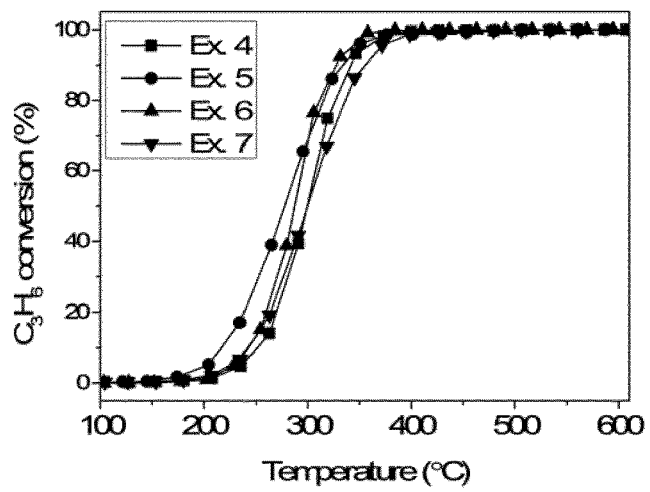
FIG. 6C is a graphical representation of the results for the catalytic propene conversion by CuO/NiO-loaded γ-alumina-support catalysts for Examples 4-7: stoichiometric feed mixture.
Figure 6D:
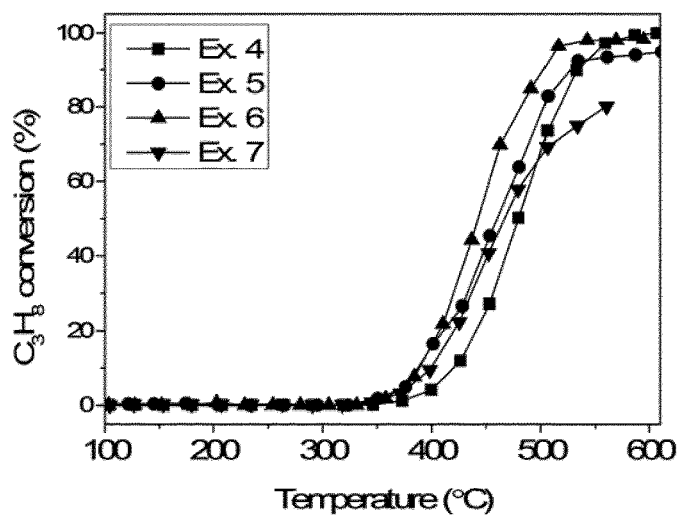
FIG. 6D is a graphical representation of the results for the catalytic propane conversion by CuO/NiO-loaded γ-alumina-support catalysts for Examples 4-7: stoichiometric feed mixture.
Figure 6E:
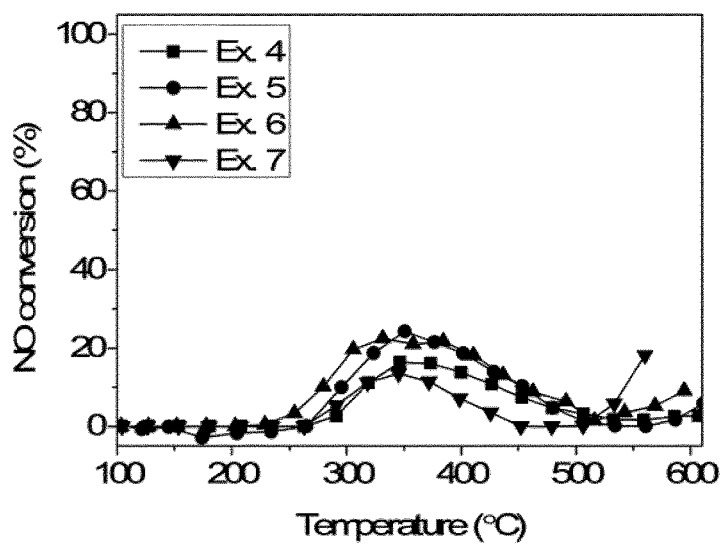
FIG. 6E is a graphical representation of the results for the catalytic NO conversion by CuO/NiO-loaded γ-alumina-support catalysts for Examples 4-7: stoichiometric feed mixture.
Figure 7A:
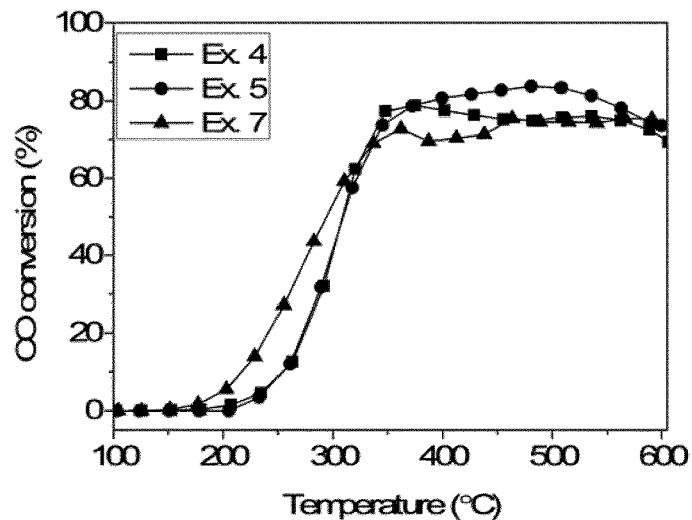
FIG. 7A is a graphical representation of the results for the catalytic CO conversion by CuO/NiO-loaded γ-alumina-support catalysts for Examples 4-7: rich feed mixture.
Figure 7B:
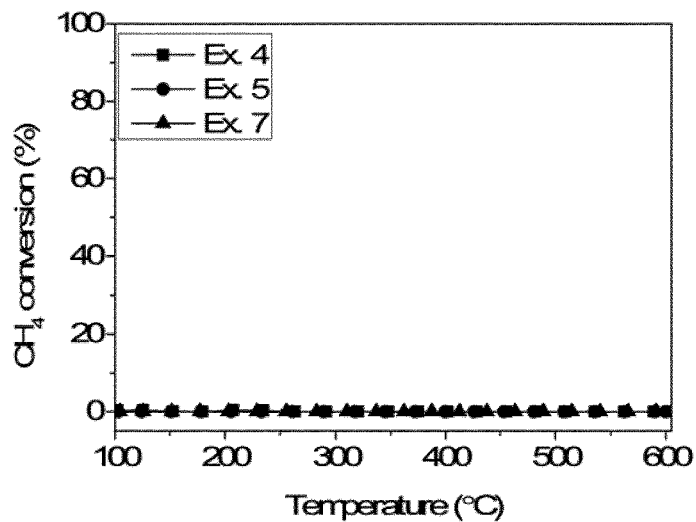
FIG. 7B is a graphical representation of the results for the catalytic methane conversion by CuO/NiO-loaded γ-alumina-support catalysts for Examples 4-7: rich feed mixture.
Figure 7C:
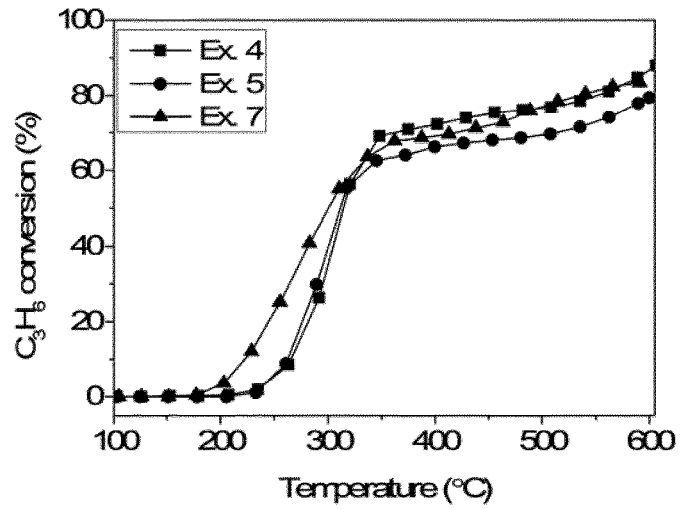
FIG. 7C is a graphical representation of the results for the catalytic propene conversion by CuO/NiO-loaded γ-alumina-support catalysts for Examples 4-7: rich feed mixture.
Figure 7D:
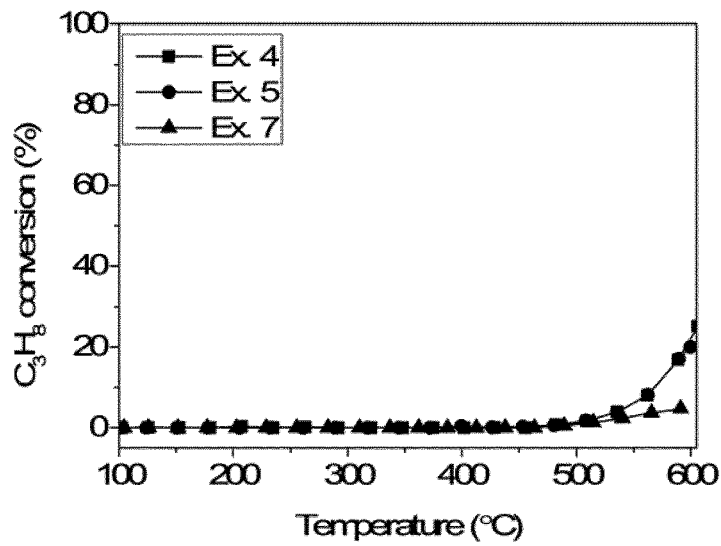
FIG. 7D is a graphical representation of the results for the catalytic propane conversion by CuO/NiO-loaded γ-alumina-support catalysts for Examples 4-7: rich feed mixture.
Figure 7E:
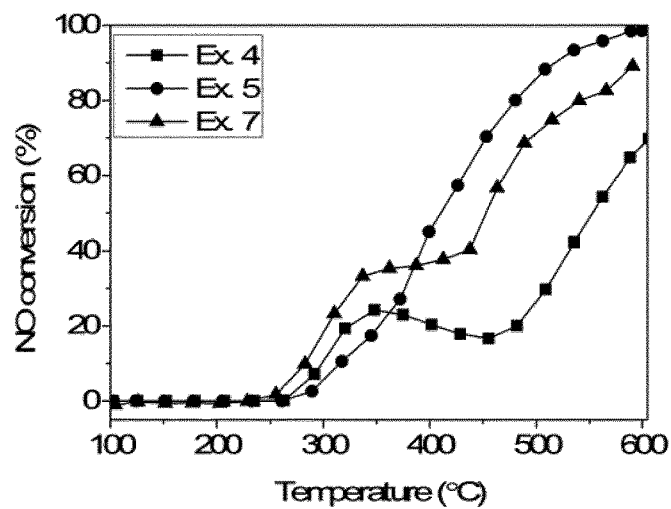
FIG. 7E is a graphical representation of the results for the catalytic NO conversion by CuO/NiO-loaded γ-alumina-support catalysts for Examples 4-7: rich feed mixture.

EXAMPLE 2 could be evaluated. The catalytic conversion of CO, C$_3$H$_6$, C$_3$H$_8$, CH$_4$ and NO for the catalyst of EXAMPLE 2 with the stoichiometric feed mixture and the rich feed mixture are shown in FIGS. 5A and 5B respectively. The data obtained with the stoichiometric and rich feed mixtures are summarised in Table 6 below.

TABLE 6

| | Stoichiometric feed mixture | | Rich feed micture | |
|---|---|---|---|---|
| | T$_{50}$ [° C.] | C$_{max}$ [%] | T$_{50}$ [° C.] | C$_{max}$ [%] |
| CO | 265 | 100 | 300 | 81 |
| CH$_4$ | 557 | 82 | — | — |
| C$_3$H$_6$ | 280 | 100 | 310 | 84.3 |

TABLE 6-continued

| | Stoichiometric feed mixture | | Rich feed micture | |
|---|---|---|---|---|
| | $T_{50}$ [° C.] | $C_{max}$ [%] | $T_{50}$ [° C.] | $C_{max}$ [%] |
| $C_3H_8$ | 470 | 100 | — | 7.5 |
| NO | — | 21.5 | 590 | 29.4/52.8 |

The catalytic activity results for EXAMPLE 1 and 2 show that even using gamma alumina supplied by TECNAN (based on the research and development carried out by Lurederra Technology Centre) the wet impregnation methodology is irreproducible, whereas the catalytic activity results with the stoichiometric feed mixture for EXAMPLES 5 and 6 produced using the ADP methodology with six-fold the quantity of ammonia added that required to achieve a 1:6 molar ratio for $Cu^{2+}$ to ammonia together with a 1:6 molar ratio for $Ni^{2+}$ to ammonia showed fairly good reproducibility, see Table 7 below.

TABLE 7

| | | CO | | $CH_4$ | | $C_3H_6$ | | $C_3H_8$ | | NO | |
|---|---|---|---|---|---|---|---|---|---|---|---|
| Example | | $T_{50}$ [° C.] | $C_{max}$ [%] | $T_{50}$ [° C.] | $C_{max}$ [%] | $T_{50}$ [° C.] | $C_{max}$ [%] | $T_{50}$ [° C.] | $C_{max}$ [%] | $T_{50}$ [° C.] | $C_{max}$ [%] |
| 5 | 10C3NA | 240 | 99.8 | 565 | 59.2 | 290 | 100 | 460 | 95.2 | — | 24.3/7.2 |
| 6 | 10C3NA | 254 | 100 | 540 | 68.1 | 285 | 100 | 450 | 98.3 | — | 22.5/9.1 |

For catalysts with 10% w/w of copper and 3% w/w of nickel (EXAMPLES 5 and 6) the catalysts' synthesis was very reproducible (see also FIGS. 6A, 6B, 6C, 6D and 6E).

On the basis of the evidence at our disposal from CuO/SBA-15 catalysts, the catalyst of EXAMPLE 2 prepared using wet impregnation methodology would be expected to exhibit poor thermal stability in catalytic properties with a stoichiometric feed mixture, whereas examples produced using the ADP process with the same composition would be expected to exhibit excellent thermal stability with a stoichiometric feed mixture.

Catalytic Properties of the Catalysts of Examples 4 to 7

The catalytic conversions for the catalysts of EXAMPLES 4 to 7 with the stoichiometric feed mixture are compared for carbon monoxide, methane, propene, propane and nitric oxide in FIGS. 6A, 6B, 6C, 6D and 6E respectively. The activity test catalysts' light-off temperature ($T_{50}$) and maximum conversion of each component for EXAMPLES 4 to 7 for the stoichiometric feed mixture together with the values for a commercial TWC are summarised in Table 8 below:

TABLE 8

| | TWC | | Example 4 | | Example 5 | | Example 6 | | Example 7 | |
|---|---|---|---|---|---|---|---|---|---|---|
| | $T_{50}$ [° C.] | $C_{max}$ [%] | $T_{50}$ [° C.] | $C_{max}$ [%] | $T_{50}$ [° C.] | $C_{max}$ [%] | $T_{50}$ [° C.] | $C_{max}$ [%] | $T_{50}$ [° C.] | $C_{max}$ [%] |
| CO | 222 | 97 | 291 | 100 | 240 | 99.8 | 254 | 100 | 263 | 100 |
| $CH_4$ | — | 10 | 550 | 81 | 565 | 59.2 | 540 | 68.1 | — | 33 |
| $C_3H_6$ | 225 | 100 | 300 | 100 | 290 | 100 | 285 | 100 | 300 | 100 |
| $C_3H_8$ | 370 | 89 | 480 | 100 | 460 | 95.2 | 450 | 98.3 | 470 | 88 |
| NO | — | 40 | — | 16.4 | — | 24.3/7.2 | — | 22.5/9.1 | — | 13.5/41.5 |

There were no significant effects on catalytic activity with the stoichiometric feed mixture of increasing the quantity of ammonia added from four-fold that required to achieve a 1:6 molar ratio for $Cu^{2+}$ to ammonia together with a 1:6 molar ratio for $Ni^{2+}$ to ammonia to ten-fold that required to achieve a 1:6 molar ratio for $Cu^{2+}$ to ammonia together with a 1:6 molar ratio for $Ni^{2+}$ to ammonia was to increase the conversion of NO, decrease that of methane and achieve a optimal conversion for six-fold for propane. EXAMPLE 7 exhibited an overall catalytic activity superior to that of the commercial three-way catalyst.

The catalytic conversions for the catalysts of EXAMPLES 4 to 7 with the rich feed mixture are compared for carbon monoxide, methane, propene, propane and nitric oxide in FIGS. 7A, 7B, 7C, 7D and 7E respectively. The activity test catalysts' light-off temperature ($T_{50}$) and maximum conversion of each component for EXAMPLES 4 to 7 for the rich feed mixture are summarised in Table 9 below.

TABLE 9

| | Example 4 | | Example 5 | | Example 7 | |
|---|---|---|---|---|---|---|
| | $T_{50}$ [° C.] | $C_{max}$ [%] | $T_{50}$ [° C.] | $C_{max}$ [%] | $T_{50}$ [° C.] | $C_{max}$ [%] |
| CO | 300 | 78 | 290 | 75.5 | 300 | 84 |
| $CH_4$ | — | — | — | — | — | — |
| $C_3H_6$ | 300 | 87 | 300 | 83.9 | 300 | 79 |
| $C_3H_8$ | — | 25 | — | 5.2 | — | 20 |
| NO | 550 | 69 | 450 | 91.1 | 400 | 98 |

There were no significant effects on catalytic activity with the rich feed mixture of increasing the quantity of ammonia added from four-fold that required to achieve a 1:6 molar ratio for $Cu^{2+}$ to ammonia together with a 1:6 molar ratio for $Ni^{2+}$ to ammonia to ten-fold that required to achieve a 1:6 molar ratio for $Cu^{2+}$ to ammonia together with a 1:6 molar ratio for $Ni^{2+}$ to ammonia.

Catalytic Properties of the Catalysts of Examples 5, 6 and 8

Figure 8A:
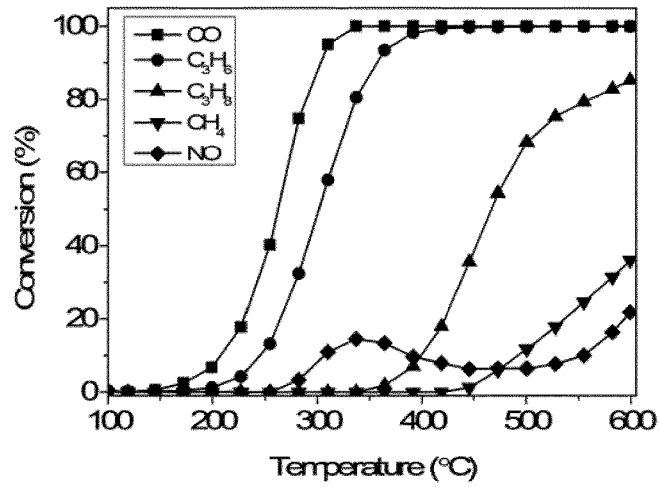
FIG. 8A is a graphical representation of the results for the catalytic conversion of CO, $C_3H_6$, $C_3H_8$, $CH_4$ and NO for the catalyst of Example 8: stoichiometric feed mixture.

The catalytic conversion of CO, $C_3H_6$, $C_3H_8$, $CH_4$ and NO for the catalyst of EXAMPLE 8 with the stoichiometric feed mixture is shown in FIG. 8A. The activity test catalysts' light-off temperature ($T_{50}$) and maximum conversion of each component for EXAMPLES 5, 6 and 8 for the stoichiometric feed mixture together with the values for a commercial TWC are summarised in Table 10 below:

TABLE 10

|  | TWC | | Example 5 | | Example 6 | | Example 8 | |
| --- | --- | --- | --- | --- | --- | --- | --- | --- |
|  | $T_{50}$ [° C.] | $C_{max}$ [%] | $T_{50}$ [° C.] | $C_{max}$ [%] | $T_{50}$ [° C.] | $C_{max}$ [%] | $T_{50}$ [° C.] | $C_{max}$ [%] |
| CO | 222 | 97 | 240 | 99.8 | 254 | 100 | 260 | 100 |
| $CH_4$ | — | 10 | 565 | 59.2 | 540 | 68.1 | — | 36 |
| $C_3H_6$ | 225 | 100 | 290 | 100 | 285 | 100 | 300 | 100 |
| $C_3H_8$ | 370 | 89 | 460 | 95.2 | 450 | 98.3 | 470 | 85 |
| NO | — | 40 | — | 24.3/7.2 | — | 22.5/9.1 | — | 14.5/21.9 |

Although the copper and nickel doping of γ-alumina was unchanged as was the relative quantity of ammonia used, halving of the concentrations of copper and nickel nitrate in the preparation of EXAMPLE 8 clearly resulted in respect of the stoichiometric feed mixture in a significant reduction in the maximum conversion of methane. However, EXAMPLES 9 and 10 exhibited promising catalytic activity, although prepared at comparable (0.019M) and significantly lower (0.013M) overall nitrate concentrations.

Figure 8B:
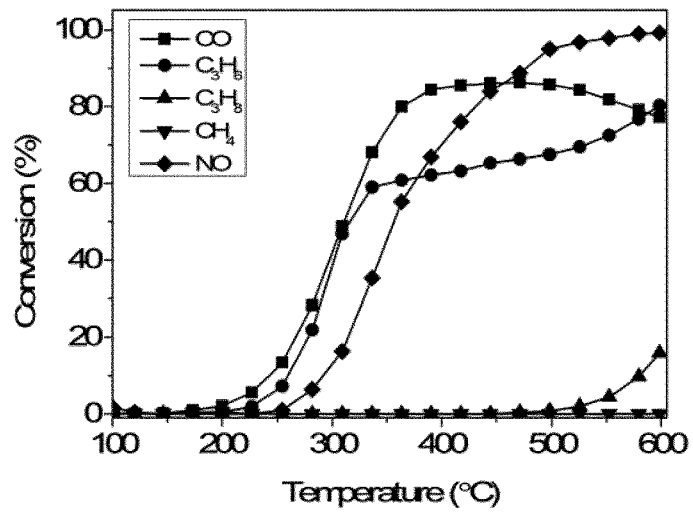
FIG. 8B is a graphical representation of the results for the catalytic conversion of CO, $C_3H_6$, $C_3H_8$, $CH_4$ and NO for the catalyst of Example 8: rich feed mixture.
Figure 9A:
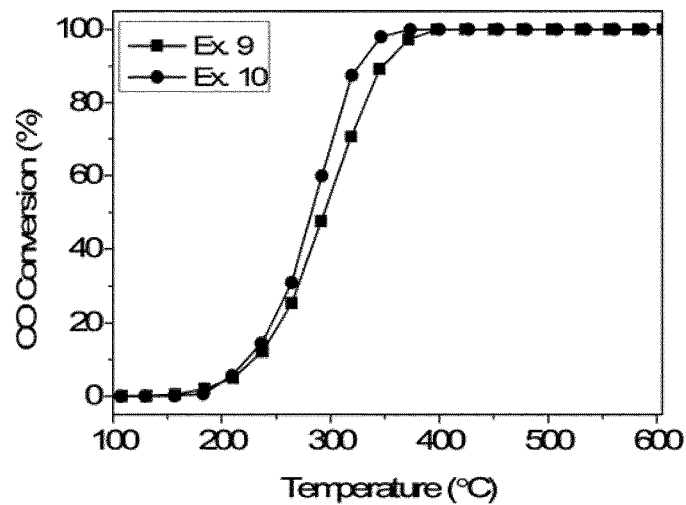
FIG. 9A is a graphical representation of the results for the catalytic CO conversion by CuO/NiO-loaded γ-alumina-support catalysts for Examples 9 and 10: stoichiometric feed mixture.
Figure 9B:
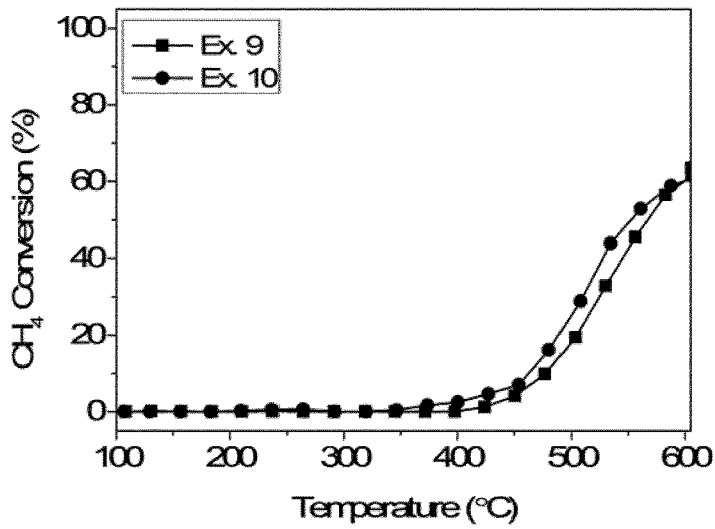
FIG. 9B is a graphical representation of the results for the catalytic methane conversion by CuO/NiO-loaded γ-alumina-support catalysts for Examples 9 and 10: stoichiometric feed mixture.
Figure 9C:
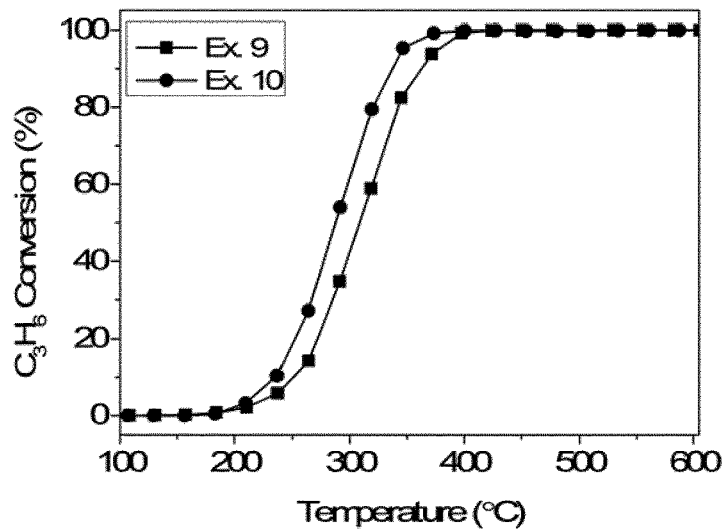
FIG. 9C is a graphical representation of the results for the catalytic propene conversion by CuO/NiO-loaded γ-alumina-support catalysts for Examples 9 and 10: stoichiometric feed mixture.
Figure 9D:
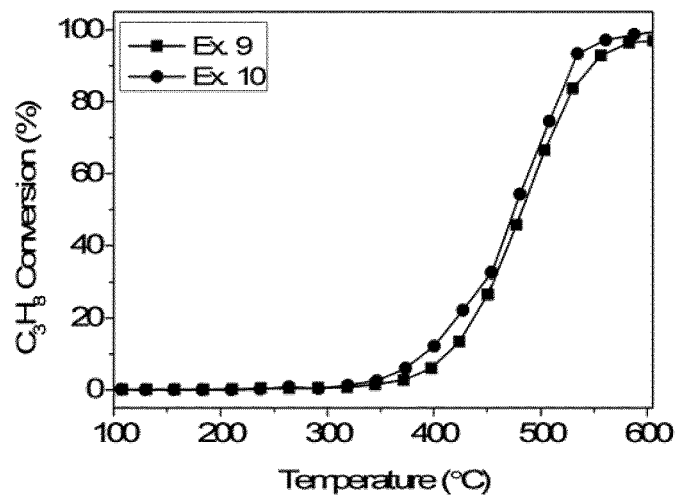
FIG. 9D is a graphical representation of the results for the catalytic propane conversion by CuO/NiO-loaded γ-alumina-support catalysts for Examples 9 and 10: stoichiometric feed mixture.
Figure 9E:
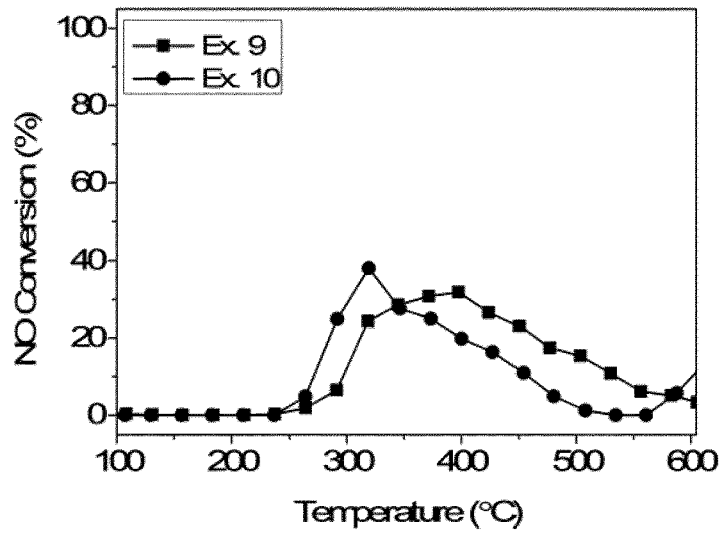
FIG. 9E is a graphical representation of the results for the catalytic NO conversion by CuO/NiO-loaded γ-alumina-support catalysts for Examples 9 and 10: stoichiometric feed mixture.

The catalytic conversion of CO, $C_3H_6$, $C_3H_8$, $CH_4$ and NO for the catalyst of EXAMPLE 8 with the rich feed mixture is shown in FIG. 8B. The activity test catalysts' light-off temperature ($T_{50}$) and maximum conversion of each component for EXAMPLES 5, 6 and 8 for the rich feed mixture are summarised in Table 11 below:

TABLE 11

|  | Example 5 | | Example 8 | |
| --- | --- | --- | --- | --- |
|  | $T_{50}$ [° C.] | $C_{max}$ [%] | $T_{50}$ [° C.] | $C_{max}$ [%] |
| CO | 290 | 75.5 | 310 | 86 |
| $CH_4$ | — | — | — | — |
| $C_3H_6$ | 300 | 83.9 | 310 | 80 |
| $C_3H_8$ | — | 5.2 | — | 16 |
| NO | 450 | 91.1 | 360 | 100 |

In the case of the rich feed mixture, halving of the concentrations of copper and nickel nitrate in the preparation of EXAMPLE 8 had no significant effect on the catalytic activity.

Hence, any concentration effect appears marginal at most.

Catalytic Activity of the Catalysts of Examples 3, 5, 6 and 9 to 14

With the Stoichiometric Feed Mixture

The catalytic activity of samples with 3% w/w of copper are shown for the stoichiometric feed mixture in FIGS. 9A, 9B, 9C, 9D and 9E for CO, $CH_4$, $C_3H_6$, $C_3H_8$ and NO respectively, with samples with 10% w/w of copper for the stoichiometric feed mixture in FIGS. 10A, 10B, 10C, 10D and 10E for CO, $CH_4$, $C_3H_6$, $C_3H_8$ and NO respectively and for samples with 20% w/w of copper are shown for the stoichiometric feed mixture in FIGS. 11A, 11B, 11C, 11D and 11E for CO, $CH_4$, $C_3H_6$, $C_3H_8$ and NO respectively.

From FIG. 9, it is evident that the catalysts with 3% w/w of copper are very active in stoichiometric conditions, with ignition temperatures for CO and propene of approx. 200° C., for propane of 350° C. and for methane of 420° C. In the case of methane and propane (FIGS. 9B and 9D respectively), both catalysts exhibited exceptional activity under stoichiometric conditions, more specifically showing a maximum conversion of propane at or above 97% and an above 60% methane conversion, which is exceptionally high and even exceeds the maximum conversion of the commercial three-way catalyst. Usually, methane is difficult to activate, so this is a very promising result. Also, some activity towards NO is achieved between 250° C. and 500° C., reaching maximum conversions of 32% and 38% for 3Cu1Ni and 3Cu3Ni respectively.

Figure 10A:
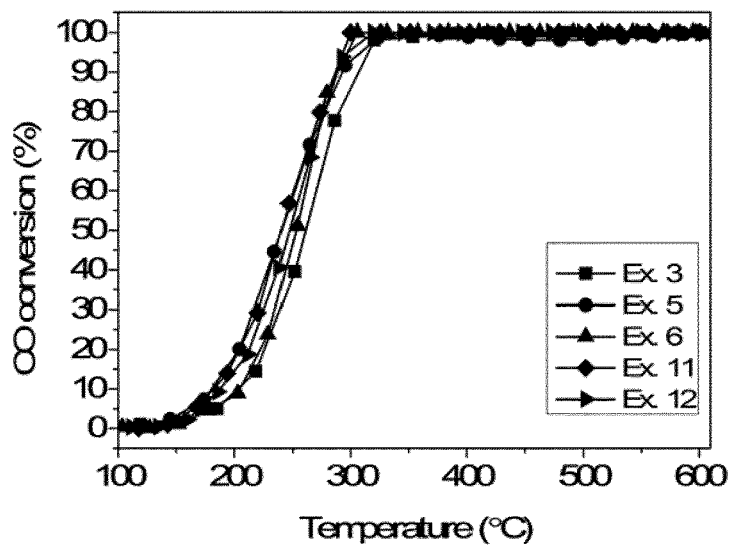
FIG. 10A is a graphical representation of the results for the catalytic CO conversion by CuO- and CuO/NiO-loaded γ-alumina-support catalysts for Examples 3, 5, 6, 11 and 12: stoichiometric feed mixture.
Figure 10B:
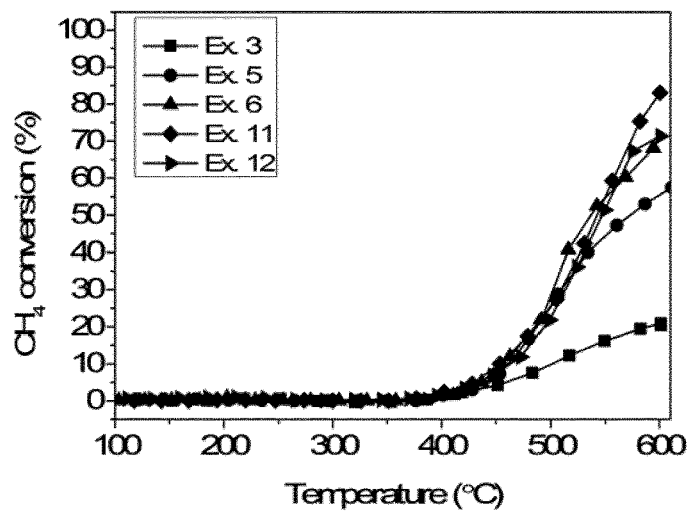
FIG. 10B is a graphical representation of the results for the catalytic methane conversion by CuO- and CuO/NiO-loaded γ-alumina-support catalysts for Examples 3, 5, 6, 11 and 12: stoichiometric feed mixture.
Figure 10C:
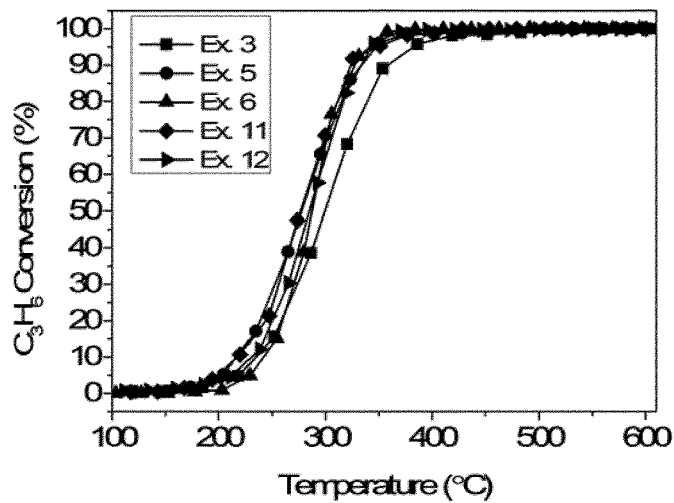
FIG. 10C is a graphical representation of the results for the catalytic propene conversion by CuO- and CuO/NiO-loaded γ-alumina-support catalysts for Examples 3, 5, 6, 11 and 12: stoichiometric feed mixture.
Figure 10D:
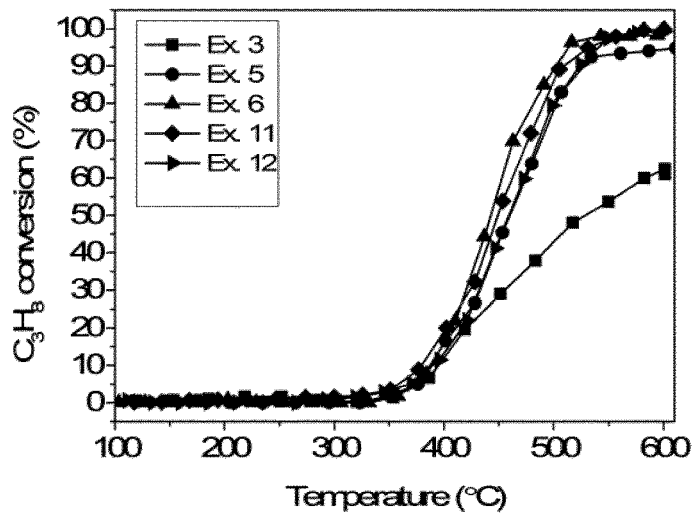
FIG. 10D is a graphical representation of the results for the catalytic propane conversion by CuO- and CuO/NiO-loaded γ-alumina-support catalysts for Examples 3, 5, 6, 11 and 12: stoichiometric feed mixture.
Figure 10E:
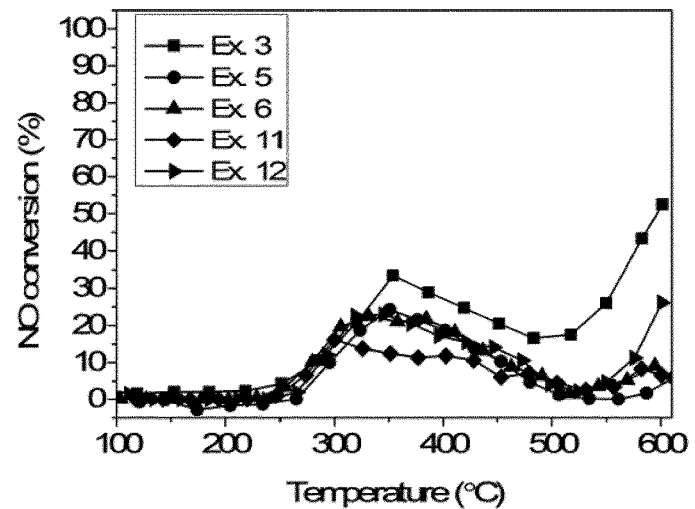
FIG. 10E is a graphical representation of the results for the catalytic NO conversion by CuO- and CuO/NiO-loaded γ-alumina-support catalysts for Examples 3, 5, 6, 11 and 12: stoichiometric feed mixture.
Figure 11A:
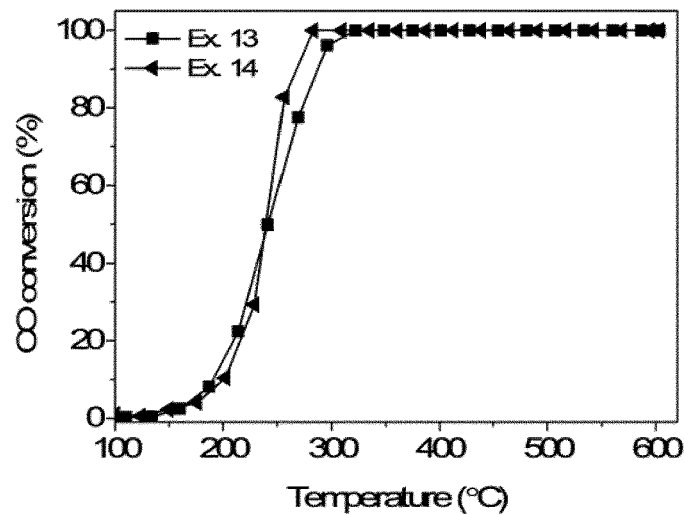
FIG. 11A is a graphical representation of the results for the catalytic CO conversion by CuO/NiO-loaded γ-alumina-support catalysts for Examples 13 and 14: stoichiometric feed mixture.
Figure 11B:
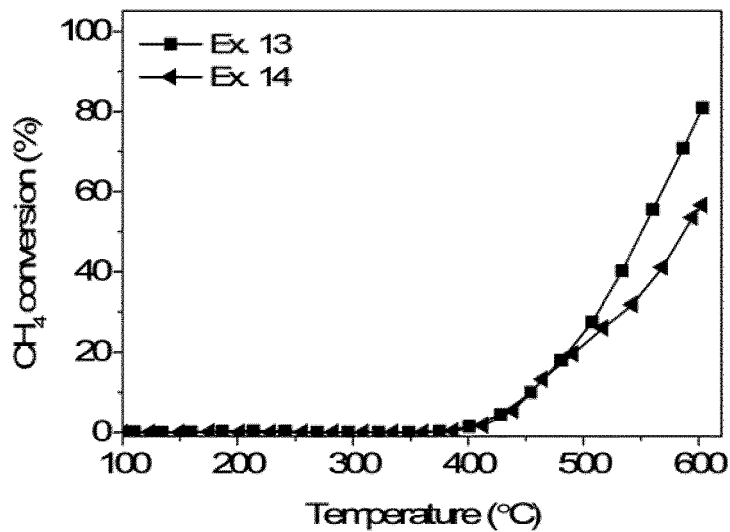
FIG. 11B is a graphical representation of the results for the catalytic methane conversion by CuO/NiO-loaded γ-alumina-support catalysts for Examples 13 and 14: stoichiometric feed mixture.
Figure 11C:
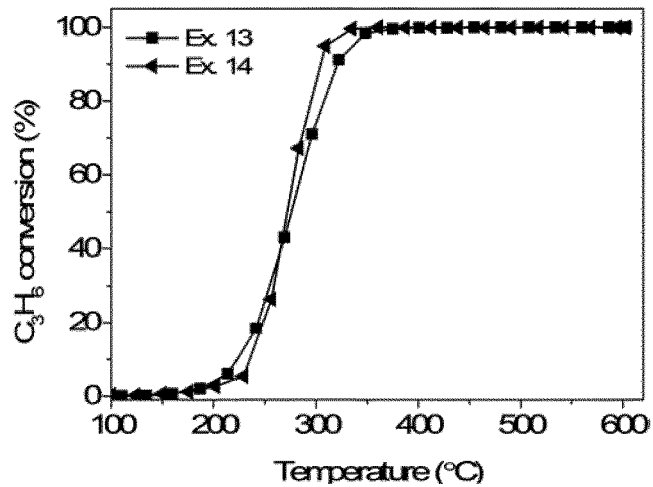
FIG. 11C is a graphical representation of the results for the catalytic propene conversion by CuO/NiO-loaded γ-alumina-support catalysts for Examples 13 and 14: stoichiometric feed mixture.
Figure 11D:
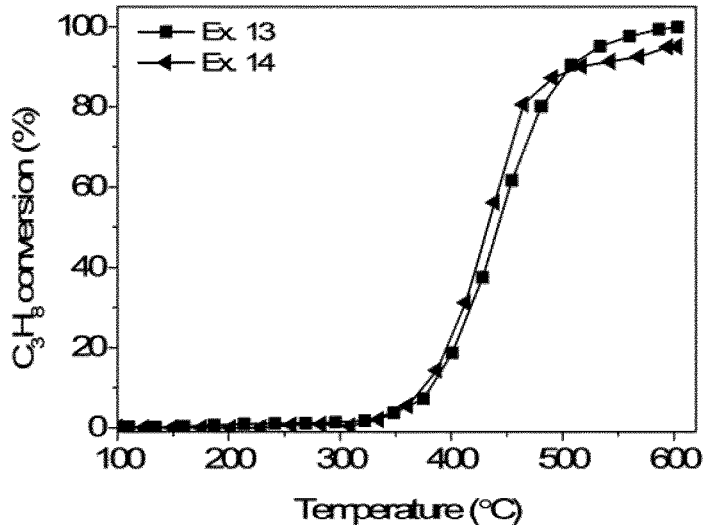
FIG. 11D is a graphical representation of the results for the catalytic propane conversion by CuO/NiO-loaded γ-alumina-support catalysts for Examples 13 and 14: stoichiometric feed mixture.
Figure 11E:
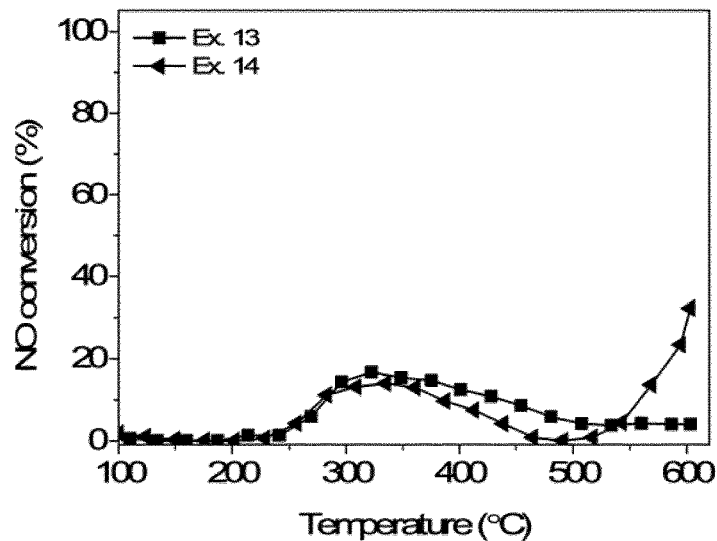
FIG. 11E is a graphical representation of the results for the catalytic NO conversion by CuO/NiO-loaded γ-alumina-support catalysts for Examples 13 and 14: stoichiometric feed mixture.
Figure 12A:
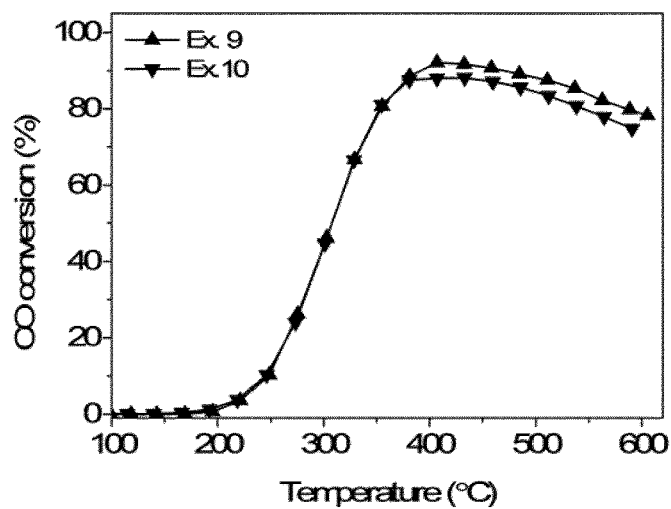
FIG. 12A is a graphical representation of the results for the catalytic CO conversion by CuO/NiO-loaded γ-alumina-support catalysts for Examples 9 and 10: rich feed mixture.
Figure 12B:
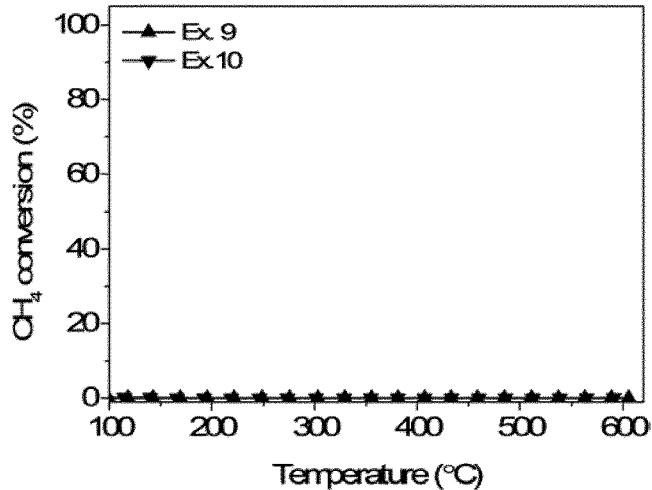
FIG. 12B is a graphical representation of the results for the catalytic methane conversion by CuO/NiO-loaded γ-alumina-support catalysts for Examples 9 and 10: rich feed mixture.
Figure 12C:
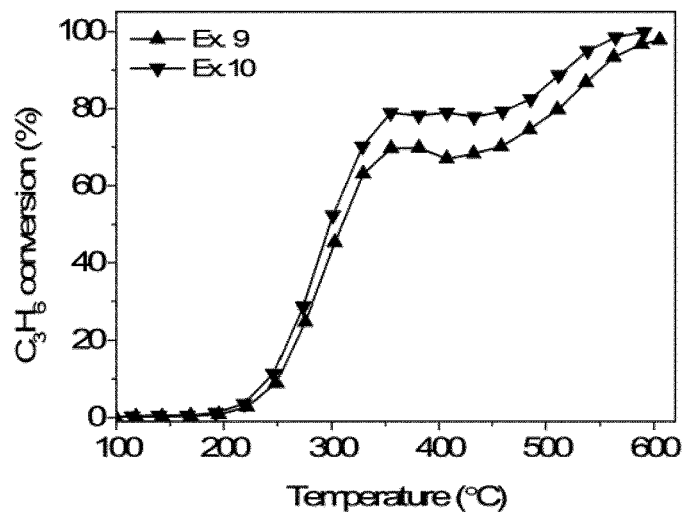
FIG. 12C is a graphical representation of the results for the catalytic propene conversion by CuO/NiO-loaded γ-alumina-support catalysts for Examples 9 and 10: rich feed mixture.
Figure 12D:
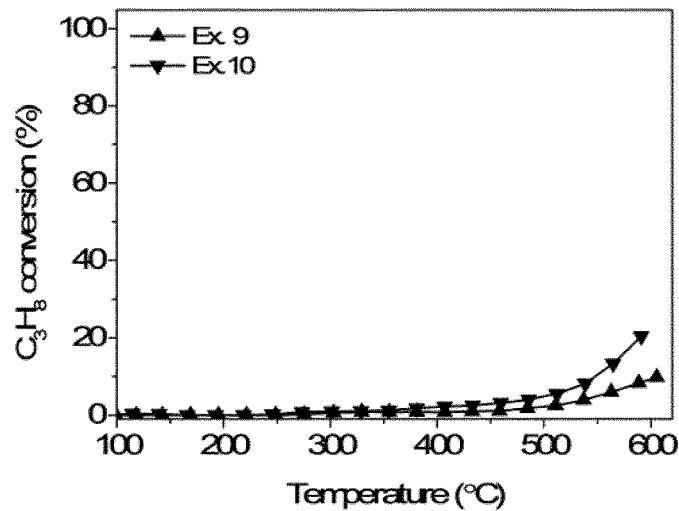
FIG. 12D is a graphical representation of the results for the catalytic propane conversion by CuO/NiO-loaded γ-alumina-support catalysts for Examples 9 and 10: rich feed mixture.
Figure 12E:
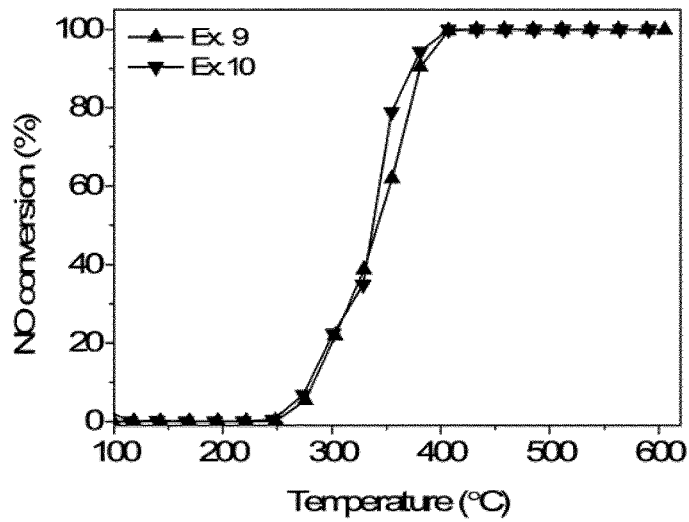
FIG. 12E is a graphical representation of the results for the catalytic NO conversion by CuO/NiO-loaded γ-alumina-support catalysts for Examples 9 and 10: rich feed mixture.
Figure 13A:
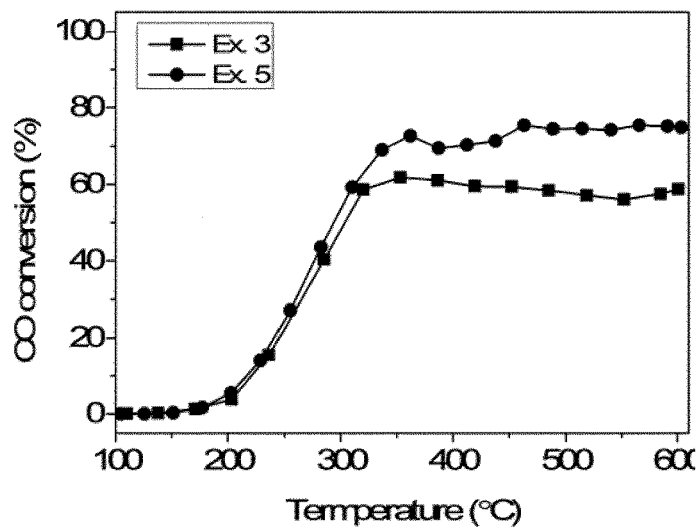
FIG. 13A is a graphical representation of the results for the catalytic CO conversion by CuO- and CuO/NiO-loaded γ-alumina-support catalysts for Examples 3 and 5: rich feed mixture.
Figure 13B:
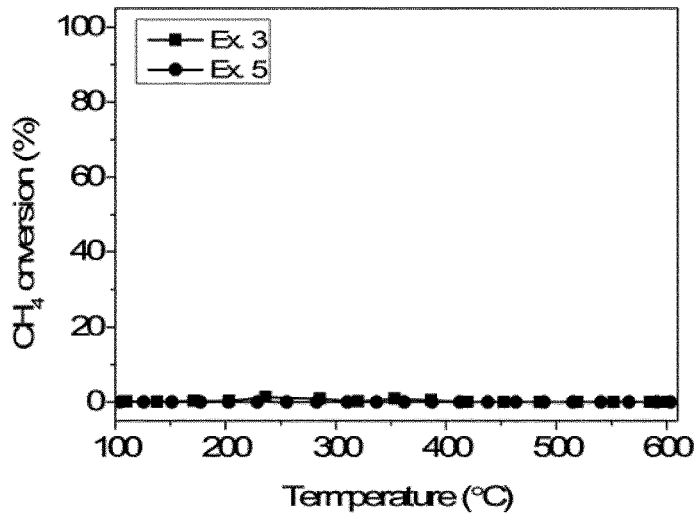
FIG. 13B is a graphical representation of the results for the catalytic methane conversion by CuO- and CuO/NiO-loaded γ-alumina-support catalysts for Examples 3 and 5: rich feed mixture.
Figure 13C:
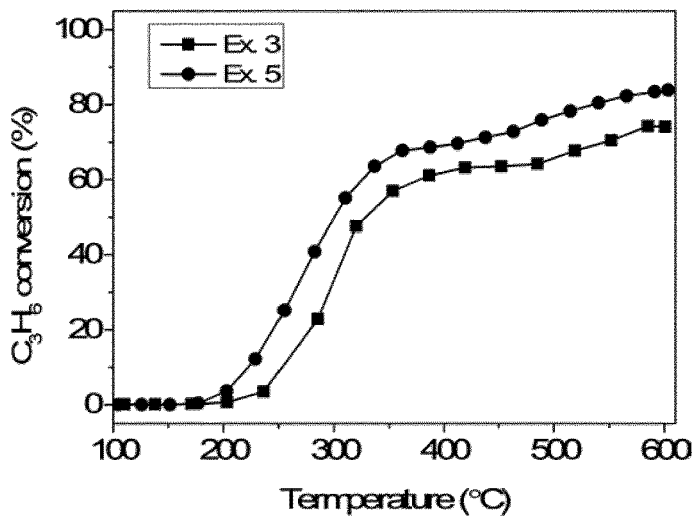
FIG. 13C is a graphical representation of the results for the catalytic propene conversion by CuO- and CuO/NiO-loaded γ-alumina-support catalysts for Examples 3 and 5: rich feed mixture.
Figure 13D:
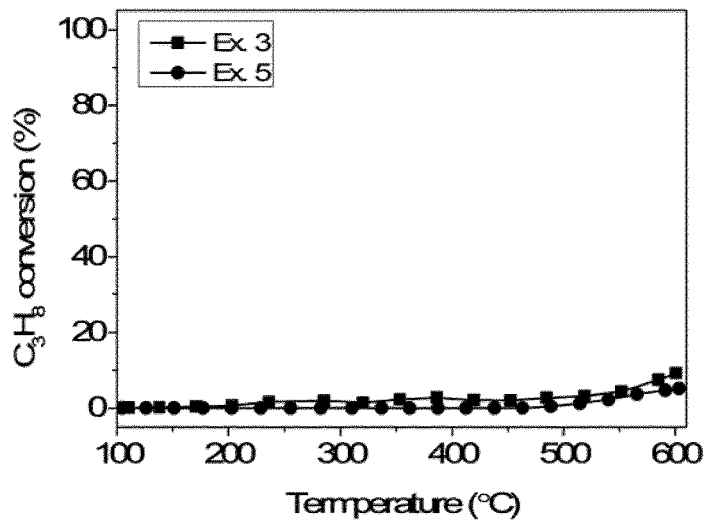
FIG. 13D is a graphical representation of the results for the catalytic propane conversion by CuO- and CuO/NiO-loaded γ-alumina-support catalysts for Examples 3 and 5: rich feed mixture.
Figure 13E:
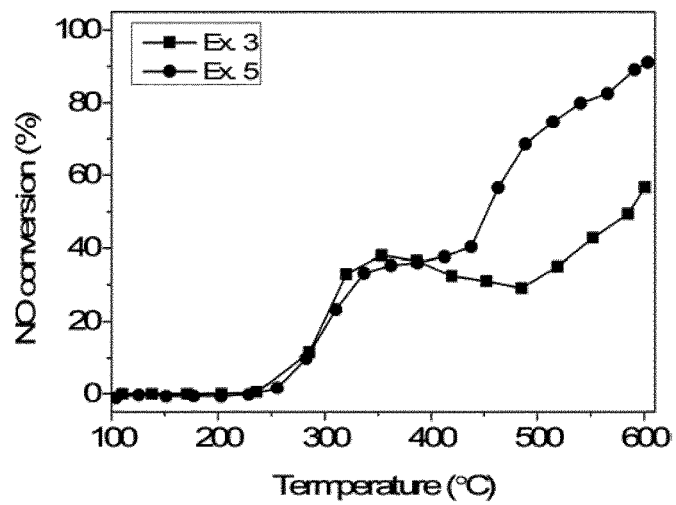
FIG. 13E is a graphical representation of the results for the catalytic NO conversion by CuO- and CuO/NiO-loaded γ-alumina-support catalysts for Examples 3 and 5: rich feed mixture.
Figure 14A:
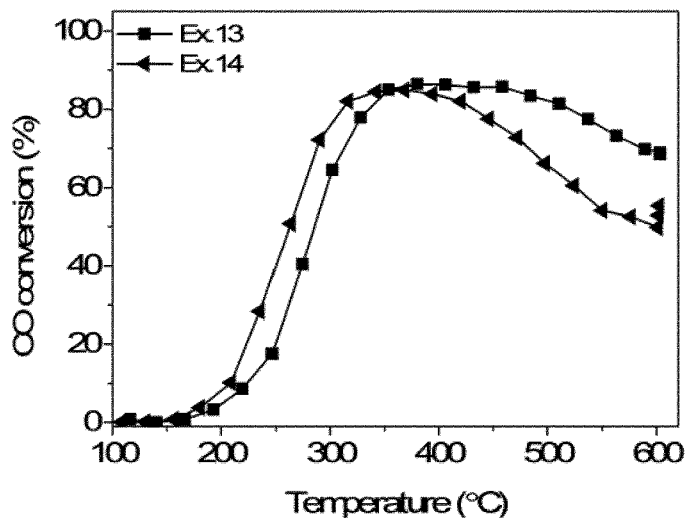
FIG. 14A is a graphical representation of the results for the catalytic CO conversion by CuO/NiO-loaded γ-alumina-support catalysts for Examples 13 and 14: rich feed mixture.
Figure 14B:
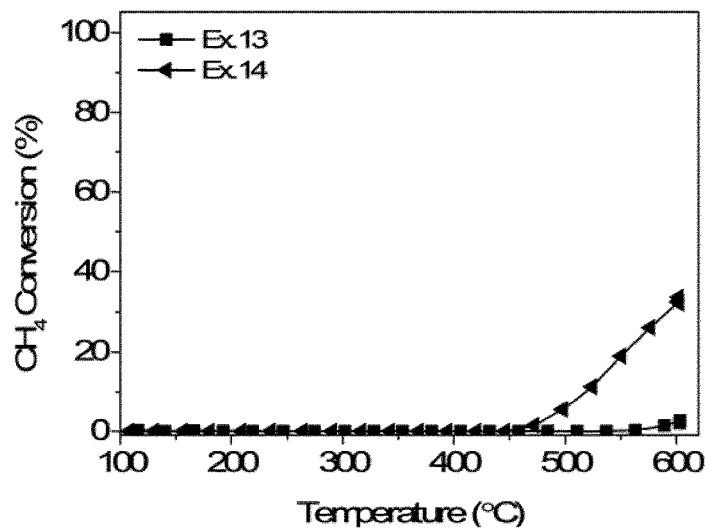
FIG. 14B is a graphical representation of the results for the catalytic methane conversion by CuO/NiO-loaded γ-alumina-support catalysts for Examples 13 and 14: rich feed mixture.
Figure 14C:
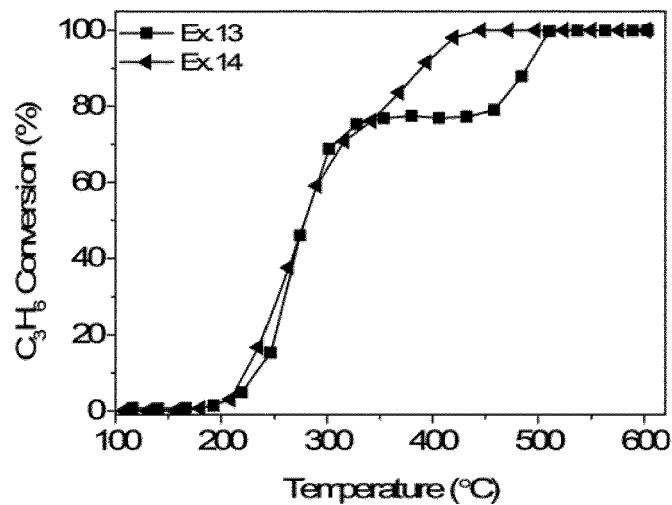
FIG. 14C is a graphical representation of the results for the catalytic propene conversion by CuO/NiO-loaded γ-alumina-support catalysts for Examples 13 and 14: rich feed mixture.
Figure 14D:
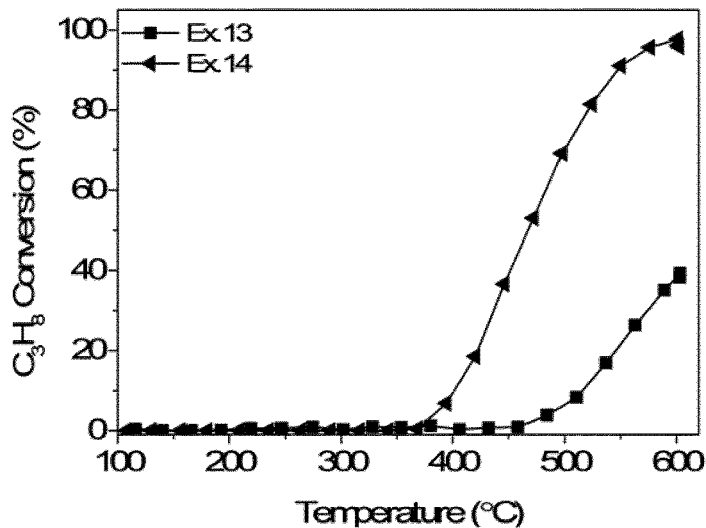
FIG. 14D is a graphical representation of the results for the catalytic propane conversion by CuO/NiO-loaded γ-alumina-support catalysts for Examples 13 and 14: rich feed mixture.
Figure 14E:
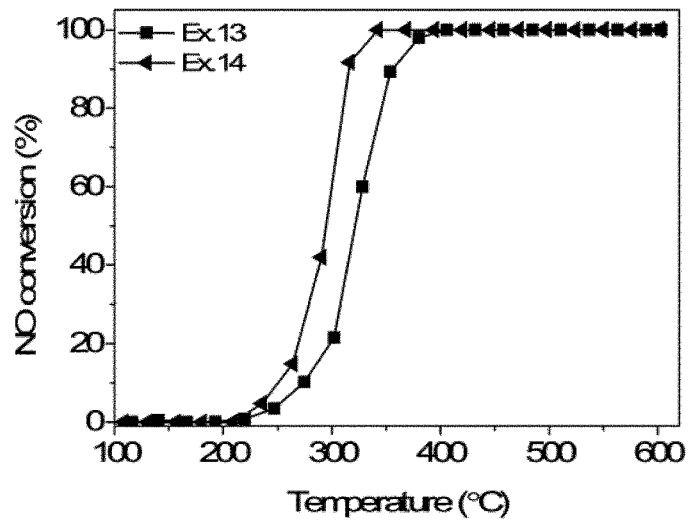
FIG. 14E is a graphical representation of the results for the catalytic NO conversion by CuO/NiO-loaded γ-alumina-support catalysts for Examples 13 and 14: rich feed mixture.

From FIG. 10, it is evident that the catalysts with 10% w/w of copper are very active in stoichiometric conditions with ignition of CO occurring at about 160° C. for all the samples and conversion being complete at 330° C., see FIG. 10A. The presence of nickel in the catalysts appears to slightly decrease the ignition temperature of the CO conversion, with the sample loaded with 5% w/w of Ni having the lowest $T_{50}$ among all the catalysts with 10% w/w of copper while the catalyst without nickel having the highest $T_{50}$. The light-off temperatures for propene oxidation are interestingly low for all samples: between 285° C. and 290° C., see FIG. 10C. In the case of methane (see FIG. 10B), the catalysts loaded with 3% w/w of nickel exhibited exceptional activity, exhibiting a maximum conversion of about 64% compared with 10% for a commercial three-way catalyst. Catalysts loaded with 5 and 10% w/w of nickel exhibited an even higher activity with the stoichiometric feed mixture, more specifically exhibiting a maximum conversion of about 80%, which is eight-fold that of the commercial three-way catalyst. In the case of propane (see FIG. 10D), the catalysts loaded with 3, 5 and 10% w/w of nickel all exhibited a maximum conversion of 95 to 100% with the stoichiometric feed mixture, which is also higher than the maximum conversion of the commercial three-way catalyst. The presence of nickel in catalysts with 10% w/w of copper, on the other hand, decreased the conversion of NO from 52 to 16 to 28%, see FIG. 10E.

From FIG. 11, it is evident that the activity of the catalysts with 20% w/w of copper was broadly similar as regards the light-off temperatures and the conversion as a function of temperature, except for the behaviour with methane and NO. From FIG. 11B it is evident that a lower amount of nickel (6.6% w/w) brought about a significant increase in methane conversion above 500° C., whereas a higher amount of nickel brought about a significant increase in NO conversion above 500° C., see FIG. 11E.

The activity test catalysts' light-off temperature ($T_{50}$) and maximum conversion of each component for EXAMPLES 3, 5, 6 and 9 to 16 for the stoichiometric feed mixture together with the values for a commercial TWC are summarised in Table 12 below:

TABLE 12

| Example | | CO T$_{50}$ [° C.] | CO C$_{max}$ [%] | CH$_4$ T$_{50}$ [° C.] | CH$_4$ C$_{max}$ [%] | C$_3$H$_6$ T$_{50}$ [° C.] | C$_3$H$_6$ C$_{max}$ [%] | C$_3$H$_8$ T$_{50}$ [° C.] | C$_3$H$_8$ C$_{max}$ [%] | NO T$_{50}$ [° C.] | NO C$_{max}$ [%] |
|---|---|---|---|---|---|---|---|---|---|---|---|
|   | TWC      | 222 | 97   | —   | 10   | 225 | 100 | 370 | 89   | —   | 40 |
| 3 | 10CA     | 260 | 100  | —   | 20.9 | 300 | 100 | 520 | 62.4 | 600 | 52.5 |
| 9 | 3C1NA    | 300 | 100  | 560 | 63.5 | 310 | 100 | 480 | 96.9 | —   | 31.9 |
| 10| 3C3NA    | 270 | 100  | 550 | 61.4 | 285 | 100 | 470 | 99.6 | —   | 38/13.6 |
| 5 | 10C3NA   | 240 | 99.8 | 565 | 59.2 | 290 | 100 | 460 | 95.2 | —   | 24.3/7.2 |
| 6 | 10C3NA   | 254 | 100  | 540 | 68.1 | 285 | 100 | 450 | 98.3 | —   | 22.5/9.1 |
| 11| 10C5NA   | 240 | 100  | 540 | 85.8 | 280 | 100 | 450 | 100  | —   | 16.2/8 |
| 12| 10C10NA  | 245 | 100  | 549 | 78   | 285 | 100 | 465 | 100  | —   | 23/28 |
| 13| 20C6.6NA | 240 | 100  | 555 | 80   | 285 | 100 | 440 | 100  | —   | 16.7 |
| 14| 20C20NA  | 235 | 100  | 590 | 56   | 275 | 100 | 435 | 95   | —   | 14/32 |

With a stoichiometric feed mixture, the light-off temperature (T$_{50}$) for CO slightly decreased, from approx. 280° C. for catalysts with 3% w/w of copper to 240° C. for catalysts with 20% w/w of copper with at the highest Cu loading, the positive effect of temperature on the reaction rate appearing stronger, reaching a total conversion of at 300° C. The conversion of methane and propane, which many three-way catalysts have problems with, are generally above 60% and 90% respectively and the conversion of NO is generally between 15 and 30%, with highs of 38% for EXAMPLE 10, 28% for EXAMPLE 12 and 32% for EXAMPLE 14 in each case associated with reduced propane conversion both due to reduced oxygen concentration.

EXAMPLE 10 exhibited overall catalytic activity comparable or superior to that of the commercial three-way catalyst, with EXAMPLES 9 and 14 being only marginally poorer in NO conversion, but far superior in methane conversion. The percentages w/w of copper and nickel with respect to gamma alumina and their ratio clearly influenced the conversion of methane and that of nitric oxide, Nickel is required to realise a high copper dispersion and hence high methane conversion levels are not possible in its absence. This enables catalysts, according to the present invention, to be tailored to the particular needs of the required application.

With the Rich Feed Mixture

The catalytic activity of samples with 3% w/w of copper are shown for the rich feed mixture are shown in FIGS. 12A, 12B, 12C, 12D and 12E for CO, CH$_4$, C$_3$H$_6$, C$_3$H$_8$ and NO respectively, with samples with 10% w/w of copper for the rich feed mixture in FIGS. 13A, 13B, 13C, 13D and 13E for CO, CH$_4$, C$_3$H$_6$, C$_3$H$_8$ and NO respectively and samples with 20% w/w of copper for the rich feed mixture in FIGS. 14A, 14B, 14C, 14D and 14E for CO, CH$_4$, C$_3$H$_6$, C$_3$H$_8$ and NO respectively.

FIG. 12 confirms the performance for samples with 3% w/w of copper with a stoichiometric feed mixture with activity in the range between 200° C. and 350° C. with oxidation of CO and propene with NO being easily reduced at 280° C. with both catalysts with a maximum conversion of 100%, but propane and methane not being oxidised.

FIG. 13 shows that in the case of a rich feed mixture catalysts with 10% w/w of copper, the oxidation of CO is limited by a lower amount of O$_2$ and higher amount of CO and hydrocarbons present in the gas-stream: at a temperature above approx. 400° C., the conversion of CO stabilizes at 75% for the catalyst with 3% w/w of nickel. This maximum conversion is significantly lower in comparison with the stoichiometric condition. The catalyst loaded with 3% w/w of Ni is the most active one. The NO conversion of the catalyst with 3% w/w of nickel increased up to a maximum of 92%, see FIG. 13E.

FIG. 14 shows that in the case of a rich feed mixture catalysts with 20% w/w of copper, combustion of CO and propene ignites at approx. 200° C. for both catalysts, but with 20% w/w nickel the conversion rates for CO had a higher dependency upon temperature, leading to a conversion of 78% compared with 65% with 6.6% w/w nickel. NO reduction was enhanced for the higher nickel concentration, the positive effect of temperature on the reaction rate being slightly higher at each temperature scanned between 200° C. and 400° C., see FIG. 14E, although the maximum conversion in both cases was 100% which was realised at significantly lower temperatures than in the case of catalysts with 10% w/w of copper.

The activity test catalysts' light-off temperature (T$_{50}$) and maximum conversion of each component for EXAMPLES 3, 5, 9, 10, 13 and 14 for the rich feed mixture are summarised in Table 13 below:

TABLE 13

| Example | | CO T$_{50}$ [° C.] | CO C$_{max}$ [%] | CH$_4$ T$_{50}$ [° C.] | CH$_4$ C$_{max}$ [%] | C$_3$H$_6$ T$_{50}$ [° C.] | C$_3$H$_6$ C$_{max}$ [%] | C$_3$H$_6$ T$_{50}$ [° C.] | C$_3$H$_6$ C$_{max}$ [%] | NO T$_{50}$ [° C.] | NO C$_{max}$ [%] |
|---|---|---|---|---|---|---|---|---|---|---|---|
| 3 | 10CA     | 300 | 99.4 | —   | 1.31 | 325 | 75.45 | —   | 9.28 | 586 | 38/56 |
| 9 | 3C1NA    | 305 | 92.1 | —   | —    | 305 | 97.8  | —   | 6.8  | 340 | 100 |
| 10| 3C3NA    | 310 | 100  | —   | 0.3  | 300 | 100   | —   | 25.5 | 335 | 100 |
| 5 | 10C3NA   | 290 | 75.5 | —   | —    | 300 | 83.9  | —   | 5.2  | 450 | 91.1 |
| 13| 20C6.6NA | 285 | 86   | —   | 2.1  | 280 | 100   | —   | 39   | 320 | 100 |
| 14| 20C20NA  | 265 | 84   | —   | 32   | 280 | 100   | 470 | 96   | 300 | 100 |

With a rich feed mixture the light-off temperature for CO conversion decreased from about 310° C. for catalysts with 3% w/w of copper to about 275° C. for catalysts with 20% w/w of copper. The light-off temperature for propene decreased from about 315° C. for catalysts with 3% w/w of copper to 280° C. for catalysts with 20% w/w of copper. Very low conversions of methane were generally observed except for 32% for EXAMPLE 14 with 20% w/w of both copper and nickel. Slightly higher conversions of propane were generally observed except for 25.5% for EXAMPLE 10 and 39 and 96% for EXAMPLES 13 and 14 both with 20% w/w of copper. NO conversions of about 100% were realised.

Catalytic Activity of the Catalysts of Examples 5, 6, 12, 15 and 16

Figure 15A:
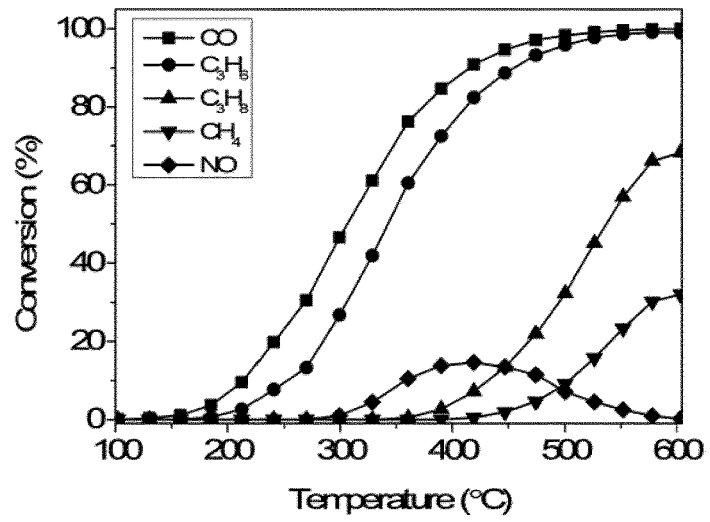
FIG. 15A is a graphical representation of the results for the catalytic conversion of CO, $C_3H_6$, $C_3H_8$, $CH_4$ and NO for the catalyst of Example 15: stoichiometric feed mixture.
Figure 16A:
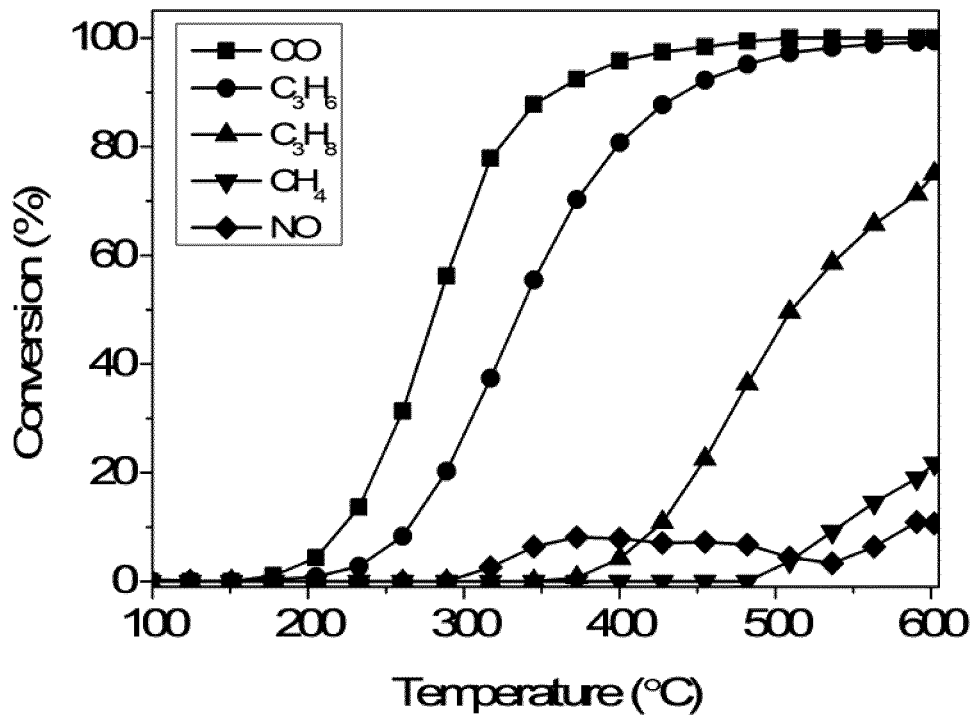
FIG. 16A is a graphical representation of the results for the catalytic conversion of CO, $C_3H_6$, $C_3H_8$, $CH_4$ and NO for the catalyst of Example 16: stoichiometric feed mixture.

The catalytic conversion of CO, $C_3H_6$, $C_3H_8$, $CH_4$ and NO for the catalyst of EXAMPLES 15 and 16 with the stoichiometric feed mixture are shown in FIGS. 15A and 16A respectively. The activity test catalysts' light-off temperature ($T_{50}$) and maximum conversion of each component for EXAMPLES 5, 6, 12, 15 and 16 for the stoichiometric feed mixture together with the values for a commercial TWC are summarised in Table 14 below:

TABLE 14

|  | TWC | | Example 5 | | Example 6 | | Example 15 | | Example 12 | | Example 16 | |
| --- | --- | --- | --- | --- | --- | --- | --- | --- | --- | --- | --- | --- |
|  | $T_{50}$ [° C.] | $C_{max}$ [%] | $T_{50}$ [° C.] | $C_{max}$ [%] | $T_{50}$ [° C.] | $C_{max}$ [%] | $T_{50}$ [° C.] | $C_{max}$ [%] | $T_{50}$ [° C.] | $C_{max}$ [%] | $T_{50}$ [° C.] | $C_{max}$ [%] |
| CO | 222 | 97 | 240 | 99.8 | 254 | 100 | 300 | 100 | 245 | 100 | 280 | 100 |
| $CH_4$ | — | 10 | 565 | 59.2 | 540 | 68.1 | — | 30 | 549 | 78 | — | 21.7 |
| $C_3H_6$ | 225 | 100 | 290 | 100 | 285 | 100 | 347 | 100 | 285 | 100 | 340 | 100 |
| $C_3H_8$ | 370 | 89 | 460 | 95.2 | 450 | 98.3 | 545 | 68 | 465 | 100 | 509 | 74 |
| NO | — | 40 | — | 24.3/7.2 | — | 22.5/9.1 | — | 13 | — | 23/28 | — | 8.1/10.9 |

The catalytic activity with a stoichiometric feed mixture of EXAMPLE 15 produced using MERCK gamma alumina is inferior to those of EXAMPLES 5 and 6 produced using TECNAN gamma alumina and having identical doping of 10% w/w of copper and 3% w/w of nickel, although exhibiting high conversion of methane. The specific properties of the nanomaterial supplied by TECNAN are derived from the technical developments carried out by Lurederra Technology Centre, and the use of upscaled material confirms the industrial viability for its supply. That with a stoichiometric feed mixture of EXAMPLE 16 produced using MERCK gamma alumina and having identical doping of 10% w/w of copper and 10% w/w of nickel, is inferior to that of EXAMPLE 12.

Figure 15B:
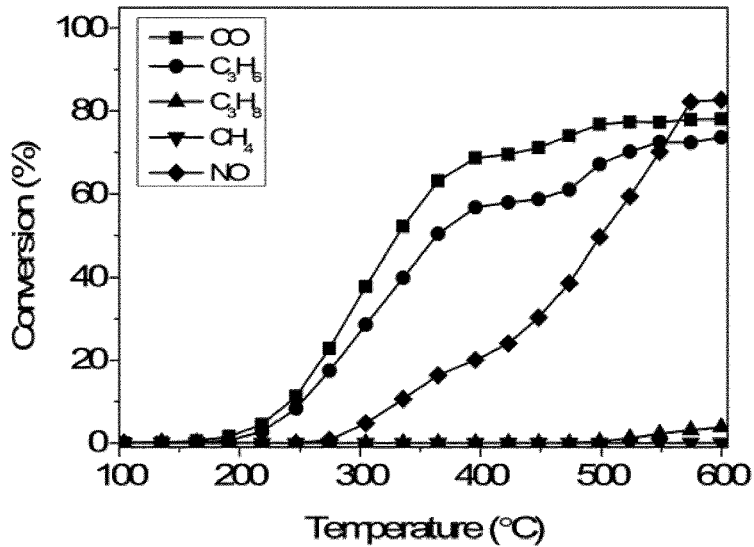
FIG. 15B is a graphical representation of the results for the catalytic conversion of CO, $C_3H_6$, $C_3H_8$, $CH_4$ and NO for the catalyst of Example 15: rich feed mixture.
Figure 16B:
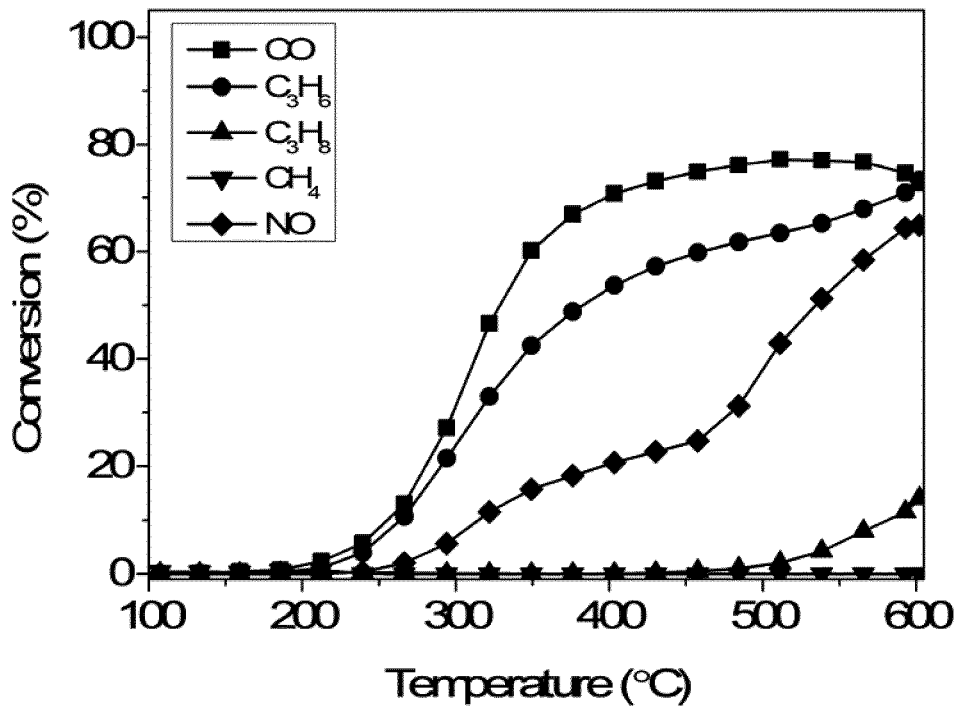
FIG. 16B is a graphical representation of the results for the catalytic conversion of CO, $C_3H_6$, $C_3H_8$, $CH_4$ and NO for the catalyst of Example 16: rich feed mixture.

The catalytic conversion of CO, $C_3H_6$, $C_3H_8$, $CH_4$ and NO for the catalyst of EXAMPLES 15 and 16 with the rich feed mixture are shown in FIGS. 15B and 16B respectively. The activity test catalysts' light-off temperature ($T_{50}$) and maximum conversion of each component for EXAMPLES 5, 6, 15 and 16 for the rich feed mixture are summarised in Table 15 below:

TABLE 15

|  | Example 5 | | Example 15 | | Example 16 | |
| --- | --- | --- | --- | --- | --- | --- |
|  | $T_{50}$ [° C.] | $C_{max}$ [%] | $T_{50}$ [° C.] | $C_{max}$ [%] | $T_{50}$ [° C.] | $C_{max}$ [%] |
| CO | 290 | 75.5 | 325 | 78 | 325 | 77 |
| $CH_4$ | — | — | — | — | — | — |
| $C_3H_6$ | 300 | 83.9 | 355 | 73 | 380 | 73 |
| $C_3H_8$ | — | 5.2 | — | 3 | — | 14 |
| NO | 450 | 91.1 | 500 | 83 | 538 | 65 |

The catalytic activity with a rich feed mixture of EXAMPLE 15 produced using MERCK gamma alumina is comparable with that of EXAMPLE 5 produced using TECNAN gamma alumina and having identical doping of 10% w/w of copper and 3% w/w of nickel.

The work leading to this invention has received funding from the European Union Seventh Framework Programme (FP7/2007-2013]) under grant agreement no. 280890".

The invention claimed is:

1. A process for the production of a catalyst comprising the steps of:
   (a) dissolving requisite quantities of copper nitrate and nickel nitrate in de-ionised water to provide a sub-0.30 molar aqueous solution of copper nitrate and nickel nitrate together in a ratio required;
   (b) providing an ammoniacal solution by adding, to the sub-0.30 molar aqueous solution, a concentrated aqueous solution of ammonia in a quantity equal to between six and ten times a quantity required to realise both a 1:6 molar ratio for $Cu^{2+}$ to ammonia and a 1:6 molar ratio for $Ni^{2+}$ to ammonia;
   (c) loading gamma alumina with 1 to 30% w/w of copper and nickel in a weight ratio of nickel to copper of 1:5 to 2:1 by suspending a requisite quantity of gamma alumina in said ammoniacal solution to achieve a required loading of copper and nickel;
   (d) stirring the resulting gamma alumina suspension for a stirring time of at least 4 hours at room temperature;
   (e) after (d), allowing at least one volatile component in the gamma alumina suspension to evaporate under ambient conditions, thereby leaving dry loaded gamma alumina; and
   (f) calcining the dry loaded gamma alumina at a temperature of at least 260° C. for at least 30 minutes with a constant heating up rate.

2. The process according to claim 1, wherein the constant heating up rate is 1° C./min.

3. The process according to claim 2, wherein the concentrations of copper and nickel nitrate in the aqueous solution are together greater than 0.005 molar.

4. The process according to claim 2, wherein the weight ratio of nickel to copper is 1:4 to 1.5:1.

5. The process according to claim 2, wherein calcining the dry loaded gamma alumina at the temperature of at least 260° C. for at least 30 minutes with the constant heating up rate comprises calcining the dry loaded gamma alumina at a temperature of at least 550° C. for at least 6 hours.

6. The process according to claim 1, wherein concentrations of copper and nickel nitrate in the sub-0.30 molar aqueous solution are together greater than 0.005 molar; or are together greater than 0.01 molar; or are together greater than 0.02 molar.

7. The process according to claim 6, wherein the weight ratio of nickel to copper is 1:4 to 1.5:1.

8. The process according to claim 1, wherein the loading of copper is 2 to 25% w/w with respect to gamma alumina if completely deposited thereon.

9. The process according to claim 1, wherein the weight ratio of nickel to copper is 1:4 to 1.5:1.

10. The process according to claim 1, wherein said stirring time is at least 48 hours.

11. The process according to claim 1, wherein calcining the dry loaded gamma alumina at the temperature of at least 260° C. for at least 30 minutes with the constant heating up rate comprises calcining the dry loaded gamma alumina at a temperature of at least 550° C.

12. The process according to claim 1, wherein calcining the dry loaded gamma alumina at the temperature of at least 260° C. for at least 30 minutes with the constant heating up rate comprises calcining the dry loaded gamma alumina for at least 6 hours.

13. The process according to claim 1, wherein:
dissolving the requisite quantities of copper nitrate and nickel nitrate in de-ionised water comprises adding 0.57 g ($2.358 \times 10^{-3}$ moles) of copper nitrate (Cu$(NO_3)_2 \cdot 3H_2O$, >99%) and 0.22 g ($7.55 \times 10^{-4}$ moles) of nickel nitrate (Ni$(NO_3)_2 \cdot 6H_2O$, >99%) to a vial containing 75 mL de-ionized water;
providing the ammoniacal solution comprises adding the concentrated aqueous solution of ammonia to the sub-0.30 molar aqueous solution with a volume equal to six times that volume of ammonia required to obtain both a molar ratio of ⅙ for $Cu^{2+}/NH_3$ and a molar ratio of ⅙ for $Ni^{2+}/NH_3$;
loading gamma alumina with 1 to 30% w/w of copper and nickel in the weight ratio of nickel to copper of 1:5 to 2:1 by suspending the requisite quantity of gamma alumina in said ammoniacal solution comprises suspending 1.5 g of gamma alumina into said ammoniacal solution to achieve a Cu/Ni loading on said gamma alumina of 10% w/w of Cu and 3% w/w of Ni if completely deposited thereon;
the stirring time is 48 hours; and
calcining the dry loaded gamma alumina at the temperature of at least 260° C. for at least 30 minutes with the constant heating up rate comprises calcining the dry loaded gamma alumina at 550° C. for 6 hours.

14. The process according to claim 1, wherein:
dissolving the requisite quantities of copper nitrate and nickel nitrate in de-ionised water comprises adding 0.57 g ($2.358 \times 10'$ moles) of copper nitrate (Cu$(NO_3)_2 \cdot 3H_2O$, >99%) and 0.72 g ($2.475 \times 10^{-1}$) of nickel nitrate (Ni$(NO_3)_2 \cdot 6H_2O$, >99%) to a vial containing 75 mL de-ionized water;
providing the ammoniacal solution comprises adding the concentrated aqueous solution of ammonia to the sub-0.30 molar aqueous solution with a volume equal to six times that volume of ammonia required to obtain both a molar ratio of ⅙ for $Cu^{2+}/NH_3$ and a molar ratio of ⅙ $Ni^{2+}/NH_3$;
loading gamma alumina with 1 to 30% w/w of copper and nickel in the weight ratio of nickel to copper of 1:5 to 2:1 by suspending the requisite quantity of gamma alumina in said ammoniacal solution comprises suspending 1.5 g of gamma alumina into said ammoniacal solution to achieve a Cu/Ni loading on said gamma alumina of 10% w/w of Cu and 10% w/w of Ni if completely deposited thereon;
the stirring time is 48 hours; and
calcining the dry loaded gamma alumina at the temperature of at least 260° C. for at least 30 minutes with the constant heating up rate comprises calcining the dry loaded gamma alumina at 550° C. for 6 hours.

15. The process according to claim 1, wherein:
dissolving the requisite quantities of copper nitrate and nickel nitrate in de-ionised water comprises adding 0.57 g ($2.358 \times 10^{-3}$ moles) of copper nitrate (Cu$(NO_3)_2 \cdot 3H_2O$, >99%) and 0.36 g ($1.23 \times 10^{-3}$ moles) of nickel nitrate (Ni$(NO_3)_2 \cdot 6H_2O$, >99%) to a vial containing 75 mL de-ionized water;
providing the ammoniacal solution comprises adding the concentrated aqueous solution of ammonia to the sub-0.30 molar aqueous solution with a volume equal to six times that volume of ammonia required to obtain both a molar ratio of ⅙ for $Cu^{2+}/NH_3$ and a molar ratio of ⅙ for $Ni^{2+}/NH_3$;
loading gamma alumina with 1 to 30% w/w of copper and nickel in the weight ratio of nickel to copper of 1:5 to 2:1 by suspending the requisite quantity of gamma alumina in said ammoniacal solution comprises suspending 1.5 g of gamma alumina into said ammoniacal solution to achieve a Cu/Ni loading on said gamma alumina of 10% w/w of Cu and 5% w/w of Ni if completely deposited thereon;
the stirring time is 48 hours; and
calcining the dry loaded gamma alumina at the temperature of at least 260° C. for at least 30 minutes with the constant heating up rate comprises calcining the dry loaded gamma alumina at 550° C. for 6 hours.

16. The process according to claim 1, wherein:
dissolving the requisite quantities of copper nitrate and nickel nitrate in de-ionised water comprises adding 0.17 g ($7.03 \times 10^{-4}$ moles) of copper nitrate (Cu$(NO_3)_2 \cdot 3H_2O$, >99%) and 0.22 g ($7.55 \times 10^{-4}$ moles) of nickel nitrate (Ni$(NO_3)_2 \cdot 6H_2O$, >99%) to a vial containing 75 mL de-ionized water;
providing the ammoniacal solution comprises adding the concentrated aqueous solution of ammonia to the sub-0.30 molar aqueous solution with a volume equal to six times that volume of ammonia required to obtain both a molar ratio of ⅙ for $Cu^{2+}/NH_3$ and a molar ratio of ⅙ for $Ni^{2+}/NH_3$;
loading gamma alumina with 1 to 30% w/w of copper and nickel in the weight ratio of nickel to copper of 1:5 to 2:1 by suspending the requisite quantity of gamma alumina in said ammoniacal solution comprises suspending 1.5 g of gamma alumina into said ammoniacal solution to achieve a Cu/Ni loading on said gamma alumina of 3% w/w of Cu and 3% w/w of Ni if completely deposited thereon;
the stirring time is 48 hours; and
calcining the dry loaded gamma alumina at the temperature of at least 260° C. for at least 30 minutes with the constant heating up rate comprises calcining the dry loaded gamma alumina at 550° C. for 6 hours.

17. The process according to claim 1, wherein:
dissolving the requisite quantities of copper nitrate and nickel nitrate in de-ionised water comprises adding 0.17 g ($7.03 \times 10^{-4}$ moles) of copper nitrate (Cu$(NO_3)_2 \cdot 3H_2O$, >99%) and 0.074 g ($2.54 \times 10'$ moles) of nickel nitrate (Ni$(NO_3)_2 \cdot 6H_2O$, >99%) to a vial containing 75 mL de-ionized water;
providing the ammoniacal solution comprises adding the concentrated aqueous solution of ammonia to the sub-0.30 molar aqueous solution with a volume equal to six times that volume of ammonia required to obtain both a molar ratio of ⅙ for $Cu^{2+}/NH_3$ and a molar ratio of ⅙ for $Ni^{2+}/NH_3$;

loading gamma alumina with 1 to 30% w/w of copper and nickel in the weight ratio of nickel to copper of 1:5 to 2:1 by suspending the requisite quantity of gamma alumina in said ammoniacal solution comprises suspending 1.5 g of gamma alumina into said ammoniacal solution to achieve a Cu/Ni loading on said gamma alumina of 3% w/w of Cu and 1% w/w of Ni if completely deposited thereon;

the stirring time is 48 hours; and calcining the dry loaded gamma alumina at the temperature of at least 260° C. for at least 30 minutes with the constant heating up rate comprises calcining the dry loaded gamma alumina at 550° C. for 6 hours.

18. The process according to claim 1, wherein:

dissolving the requisite quantities of copper nitrate and nickel nitrate in de-ionised water comprises adding 1.14 g (4.716×10$^{-3}$ moles) of copper nitrate (Cu(NO$_3$)$_2$·3H$_2$O, >99%) and 1.44 g (4.94×10$^{-3}$ moles) of nickel nitrate (Ni(NO$_3$)$_2$·6H$_2$O, >99%) to a vial containing 75 mL de-ionized water;

providing the ammoniacal solution comprises adding the concentrated aqueous solution of ammonia to the sub-0.30 molar aqueous solution with a volume equal to six times that volume of ammonia required to obtain both a molar ratio of ⅙ for Cu$^{2+}$/NH$_3$ and a molar ratio of ⅙ for Ni$^{2+}$/NH$_3$;

loading gamma alumina with 1 to 30% w/w of copper and nickel in the weight ratio of nickel to copper of 1:5 to 2:1 by suspending the requisite quantity of gamma alumina in said ammoniacal solution comprises suspending 1.5 g of gamma alumina into said ammoniacal solution to achieve a Cu/Ni loading on said gamma alumina of 20% w/w of Cu and 20% w/w of Ni if completely deposited thereon;

the stirring time is 48 hours; and calcining the dry loaded gamma alumina at the temperature of at least 260° C. for at least 30 minutes with the constant heating up rate comprises calcining the dry loaded gamma alumina at 550° C. for 6 hours.

19. The process according to claim 1, wherein:

dissolving the requisite quantities of copper nitrate and nickel nitrate in de-ionised water comprises adding 1.14 g (4.716×10$^{-3}$ moles) of copper nitrate (Cu(NO$_3$)$_2$·3H$_2$O, >99%) and 0.48 g (1.646×10$^{-3}$ moles) of nickel nitrate (Ni(NO$_3$)$_2$·6H$_2$O, >99%) to a vial containing 75 mL de-ionized water;

providing the ammoniacal solution comprises adding the concentrated aqueous solution of ammonia to the sub-0.30 molar aqueous solution with a volume equal to six times that volume of ammonia required to obtain both a molar ratio of ⅙ for Cu$^{2+}$/NH$_3$ and a molar ratio of ⅙ for Ni$^{2+}$/NH$_3$;

loading gamma alumina with 1 to 30% w/w of copper and nickel in the weight ratio of nickel to copper of 1:5 to 2:1 by suspending the requisite quantity of gamma alumina in said ammoniacal solution comprises suspending 1.5 g of gamma alumina into said ammoniacal solution to achieve a Cu/Ni loading on said gamma alumina of 20% w/w of Cu and 6.6% w/w of Ni if completely deposited thereon;

the stirring time is 48 hours; and calcining the dry loaded gamma alumina at the temperature of at least 260° C. for at least 30 minutes with the constant heating up rate comprises calcining the dry loaded gamma alumina at 550° C. for 6 hours.

20. A catalyst or catalyst mixture, the catalyst or each catalyst in the catalyst mixture resulting from a process comprising the steps of:

(a) dissolving requisite quantities of copper nitrate and nickel nitrate in de-ionised water to provide a sub-0.30 molar aqueous solution of copper nitrate and nickel nitrate together in a ratio required;

(b) providing an ammoniacal solution by adding, to the sub-0.30 molar aqueous solution, a concentrated aqueous solution of ammonia in a quantity equal to between six and ten times a quantity required to realise both a 1:6 molar ratio for Cu$^{2+}$ to ammonia and a 1:6 molar ratio for Ni$^{2+}$ to ammonia;

(c) loading gamma alumina with 1 to 30% w/w of copper and nickel in a weight ratio of nickel to copper of 1:5 to 2:1 by suspending a requisite quantity of gamma alumina in said ammoniacal solution to achieve a required loading of copper and nickel;

(d) stirring the resulting gamma alumina suspension for a stirring time of at least 4 hours at room temperature;

(e) after (d), allowing at least one volatile component in the gamma alumina suspension to evaporate under ambient conditions, thereby leaving dry loaded gamma alumina; and (f) calcining the dry loaded gamma alumina at a temperature of at least 260° C. for at least 30 minutes with a constant heating up rate.

* * * * *